United States Patent
Kudo

(10) Patent No.: US 9,237,517 B2
(45) Date of Patent: Jan. 12, 2016

(54) BASE STATION AND CONTROL METHOD THEREOF

(75) Inventor: Shunsuke Kudo, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 260 days.

(21) Appl. No.: 13/884,223

(22) PCT Filed: Nov. 8, 2011

(86) PCT No.: PCT/JP2011/075755
§ 371 (c)(1),
(2), (4) Date: May 8, 2013

(87) PCT Pub. No.: WO2012/063834
PCT Pub. Date: May 18, 2012

(65) Prior Publication Data
US 2013/0223317 A1     Aug. 29, 2013

(30) Foreign Application Priority Data

Nov. 10, 2010  (JP) .................. 2010-252347

(51) Int. Cl.
*H04W 52/02* (2009.01)
*H04W 16/32* (2009.01)
(52) U.S. Cl.
CPC .......... *H04W 52/0206* (2013.01); *H04W 16/32* (2013.01)
(58) Field of Classification Search
USPC ....................................................... 370/311
See application file for complete search history.

(56) References Cited

U.S. PATENT DOCUMENTS

| | | | |
|---|---|---|---|
| 6,584,330 B1* | 6/2003 | Ruuska | 455/574 |
| 2003/0193917 A1* | 10/2003 | Song et al. | 370/335 |
| 2010/0002614 A1* | 1/2010 | Subrahmanya | 370/311 |
| 2010/0144363 A1* | 6/2010 | De Rosa et al. | 455/452.1 |
| 2010/0195501 A1* | 8/2010 | Tynderfeldt et al. | 370/235 |
| 2010/0246462 A1* | 9/2010 | Lindgren et al. | 370/311 |
| 2011/0070881 A1* | 3/2011 | Hwang et al. | 455/423 |
| 2011/0096687 A1* | 4/2011 | Dottling et al. | 370/252 |
| 2011/0201334 A1* | 8/2011 | Rosenqvist et al. | 455/436 |

(Continued)

FOREIGN PATENT DOCUMENTS

| | | | |
|---|---|---|---|
| JP | 2003-037555 A | 2/2003 | |
| JP | 2010-220053 A | 9/2010 | |

(Continued)

OTHER PUBLICATIONS

3GPP TR 36.902 V9.2.0 (Jun. 2010); 3rd Generation Partnership Project; Technical Specification Group Radio Access Network; Evolved Universal Terrestrial Radio Access Network (E-UTRAN); Self-configuring and self-optimizing network (SON) use cases and solutions (Release 9).

(Continued)

*Primary Examiner* — Jenee Williams
(74) *Attorney, Agent, or Firm* — Studebaker & Brackett PC

(57) ABSTRACT

A micro base station eNB-B, which is adjacent to a macro base station eNB-A and used in a cellular mobile communication system, comprises: a radio communication unit 110 that communicates with a radio terminal UE; and a control unit 150 that performs control to switch a power consumption state of the radio communication unit 110 on the basis of neighboring base station load information on a traffic load of the macro base station eNB-A adjacent to the base station.

6 Claims, 14 Drawing Sheets

(56) References Cited

U.S. PATENT DOCUMENTS

| | | |
|---|---|---|
| 2011/0237257 A1* | 9/2011 | Soliman et al. .............. 455/436 |
| 2011/0256826 A1 | 10/2011 | Ode et al. |
| 2011/0280219 A1* | 11/2011 | Fashandi et al. ............. 370/331 |
| 2012/0004009 A1* | 1/2012 | Lindoff et al. ................ 455/522 |
| 2012/0028674 A1* | 2/2012 | Zhao ............................. 455/522 |
| 2012/0051260 A1* | 3/2012 | Tamaki ......................... 370/253 |
| 2012/0082064 A1* | 4/2012 | Awoniyi et al. .............. 370/255 |
| 2012/0106349 A1* | 5/2012 | Adjakple et al. ............. 370/241 |
| 2012/0142328 A1* | 6/2012 | Awoniyi et al. .............. 455/418 |
| 2012/0289224 A1* | 11/2012 | Hallberg et al. ............. 455/424 |
| 2013/0135994 A1* | 5/2013 | Michel et al. ................ 370/229 |
| 2013/0157677 A1* | 6/2013 | Liao et al. .................. 455/452.1 |

FOREIGN PATENT DOCUMENTS

| | | |
|---|---|---|
| WO | 2010/035577 A1 | 4/2010 |
| WO | 2010/086979 A1 | 8/2010 |

OTHER PUBLICATIONS

International Search Report; PCT/JP2011/075755; Dec. 6, 2011.
An Office Action; "Notice of Reasons for Rejection," issued by the Japanese Patent Office on Apr. 1, 2014, which corresponds to Japanese Patent Application No. 2012-542937 and is related to U.S. Appl. No. 13/884,223; with English language statement of relevance.

* cited by examiner

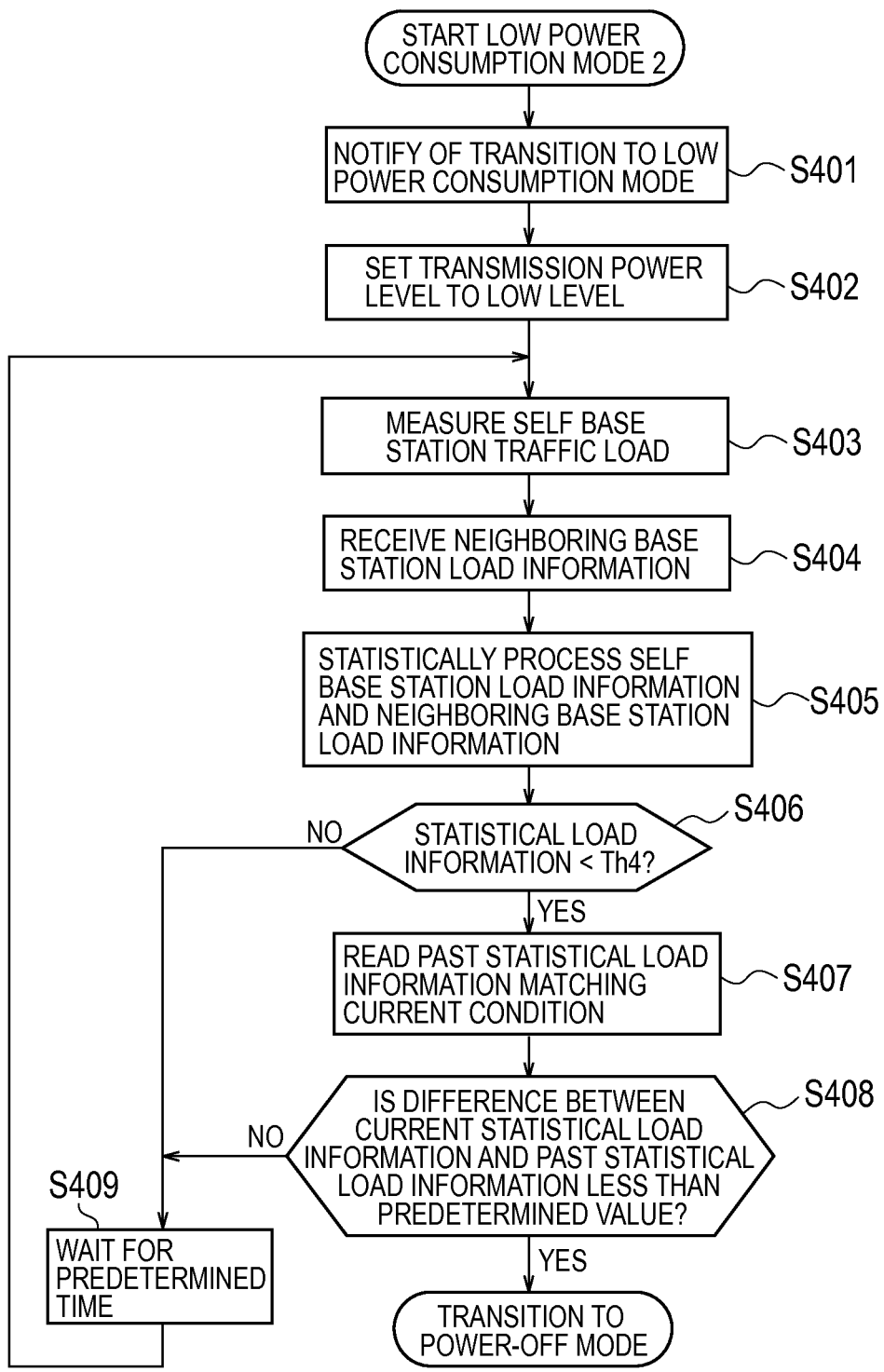

BASE STATION AND CONTROL METHOD THEREOF

TECHNICAL FIELD

The present invention relates to a base station with which it is possible to reduce power consumption, and also relates to a control method thereof.

BACKGROUND ART

In LTE (Long Term Evolution) standardized in 3GPP (3rd Generation Partnership Project) which is a group aiming to standardize a cellular mobile communication system, SON (Self-Organizing Network) is applied in which a radio base station is able to change setting relating to a base station without using any manpower. As one type of the SON, there is an energy saving technology in which a base station reduces its own power consumption (refer to Non-Patent Literature 1).

Furthermore, in LTE, and LTE Advanced, which is a sophisticated version of LTE, there has been proposed a network configuration in which a base station (hereinafter, a small base station) having transmission power lower than that of a macro base station is added to a radio communication network including the macro base station. According to such a small base station, since it is possible to complement a communication area of the macro base station or distribute the traffic load of the macro base station, it is possible to improve service quality.

CITATION LIST

Non-Patent Literature

Non-Patent Literature 1: 3GPP TR36.902 V9.2.0, "Self-configuring and self-optimizing network (SON) use cases and solutions", 2010-06

SUMMARY OF THE INVENTION

In the aforementioned energy saving technology, there has been considered a method in which a macro base station controls its own power consumption, on the base of its own traffic load. For example, in a macro base station with divided sectors, the power of some sectors are turned off when its own traffic load is low, so that it is possible to reduce the power consumption of the macro base station.

However, a configuration with divided sectors is not generally employed for the small base station, and it is difficult to apply a control method similar to that of the macro base station.

Furthermore, in the case in which the power of the small base station is turned off in order to reduce the power consumption of the small base station, when the traffic load of a macro base station adjacent to the small base station increases, there is a problem that it is not possible to provide a high quality service to a radio terminal.

Therefore, an object of the present invention is to provide a base station and a control method thereof, with which it is possible to reduce power consumption while preventing the deterioration of service quality.

In order to solve the aforementioned problem, the present invention has following characteristics. First, a characteristic of a base station according to the present invention is summarized as follows. The base station, which is adjacent to a macro base station and used in a cellular mobile communication system, comprises: a radio communication unit that communicates with a radio terminal; and a control unit that performs control to switch a power consumption state of the radio communication unit on the basis of neighboring base station load information on a traffic load of the macro base station adjacent to the base station.

According to such a characteristic, the base station performs control to switch a power consumption state of the radio communication unit of the base station on the basis of neighboring base station load information on a traffic load of a macro base station adjacent to the base station.

In this way, when the traffic load of the macro base station adjacent to the base station is high, it is possible to perform control prioritizing communication with a radio terminal over the reduction of power consumption. Meanwhile, when the traffic load of the macro base station adjacent to the base station is low, it is possible to perform control prioritizing the reduction of power consumption over the communication with the radio terminal.

Consequently, in accordance with the base station according to the characteristic, it is possible to reduce power consumption while preventing the deterioration of service quality.

Another characteristic of the base station according to the present invention is summarized as follows. The base station according to the above characteristic further comprises a network communication unit that receives the neighboring base station load information using inter-base-station communication, wherein the control unit performs control to switch the power consumption state of the radio communication unit on the basis of the neighboring base station load information received by the network communication unit.

Another characteristic of the base station according to the present invention is summarized as follows. In the base station according to the above characteristic, the control unit performs control to switch the radio communication unit from a power-off mode, in which an operation of the radio communication unit is stopped, to a low power consumption mode, in which the radio communication unit operates in a low power consumption state, on the basis of the neighboring base station load information.

Another characteristic of the base station according to the present invention is summarized as follows. In the base station according to the above characteristic, the neighboring base station load information includes first neighboring base station load information newly received by the network communication unit, and the control unit performs control to switch the radio communication unit from the power-off mode to the low power consumption mode, when the first neighboring base station load information exceeds a first threshold value.

Another characteristic of the base station according to the present invention is summarized as follows. The base station according to the above characteristic further comprises a storage unit, wherein the neighboring base station load information includes second neighboring base station load information stored in the storage unit according to conditions, which is neighboring base station load information obtained in a past by the network communication unit, and the control unit, even in a case in which the first neighboring base station load information exceeds the first threshold value, performs control such that the radio communication unit is not switched from the power-off mode to the low power consumption mode, when a difference between the first neighboring base station load information and the second neighboring base station load information under the same condition as a condition of the first neighboring base station load information is equal to or larger than a predetermined value, or when the second neighboring base station load information under the same condition as the condition of the first neighboring base station load information falls below the first threshold value.

Another characteristic of the base station according to the present invention is summarized as follows. In the base station according to the above characteristic, the control unit performs control to switch the radio communication unit from a low power consumption mode, in which the radio communication unit operates in a low power consumption state, to a high power consumption mode, in which the radio communication unit operates in a high power consumption state, on the basis of the neighboring base station load information.

Another characteristic of the base station according to the present invention is summarized as follows. In the base station according to the above characteristic, the neighboring base station load information includes first neighboring base station load information newly received by the network communication unit, and the control unit performs control to switch the radio communication unit from the low power consumption mode to the high power consumption mode, when the first neighboring base station load information exceeds a second threshold value.

Another characteristic of the base station according to the present invention is summarized as follows. The base station according to the above characteristic further comprises a storage unit, wherein the neighboring base station load information includes second neighboring base station load information stored in the storage unit according to conditions, which is neighboring base station load information obtained in a past by the network communication unit, and the control unit, even in a case in which the first neighboring base station load information exceeds the second threshold value, performs control such that the radio communication unit is not switched from the low power consumption mode to the high power consumption mode, when a difference between the first neighboring base station load information and the second neighboring base station load information under the same condition as a condition of the first neighboring base station load information is equal to or larger than a predetermined value, or when the second neighboring base station load information under the same condition as the condition of the first neighboring base station load information falls below the second threshold value.

Another characteristic of the base station according to the present invention is summarized as follows. In the base station according to the above characteristic, the control unit performs control to switch the radio communication unit from a high power consumption mode, in which the radio communication unit operates in a high power consumption state, to a low power consumption mode, in which the radio communication unit operates in a low power consumption state, on the basis of the neighboring base station load information.

Another characteristic of the base station according to the present invention is summarized as follows. In the base station according to the above characteristic, the neighboring base station load information includes first neighboring base station load information newly received by the network communication unit, and the control unit performs control to switch the radio communication unit from the high power consumption mode to the low power consumption mode, when the first neighboring base station load information falls below a third threshold value.

Another characteristic of the base station according to the present invention is summarized as follows. The base station according to the above characteristic further comprises a storage unit, wherein the neighboring base station load information is includes second neighboring base station load information stored in the storage unit according to conditions, which is neighboring base station load information obtained in a past by the network communication unit, and the control unit, even in a case in which the first neighboring base station load information falls below the third threshold value, performs control such that the radio communication unit is not switched from the high power consumption mode to the low power consumption mode, when a difference between the first neighboring base station load information and the second neighboring base station load information under the same condition as a condition of the first neighboring base station load information is equal to or larger than a predetermined value, or when the second neighboring base station load information under the same condition as the condition of the first neighboring base station load information exceeds the third threshold value.

Another characteristic of the base station according to the present invention is summarized as follows. The base station according to the above characteristic further comprises a storage unit, wherein the neighboring base station load information is includes second neighboring base station load information stored in the storage unit according to conditions, which is neighboring base station load information obtained in a past by the network communication unit, and the control unit, even in a case in which the first neighboring base station load information falls below the third threshold value, performs control such that the radio communication unit is not switched from the high power consumption mode to the low power consumption mode, when a difference between the first neighboring base station load information and the second neighboring base station load information under the same condition as a condition of the first neighboring base station load information is equal to or larger than a predetermined value, or when the second neighboring base station load information under the same condition as the condition of the first neighboring base station load information exceeds the third threshold value.

Another characteristic of the base station according to the present invention is summarized as follows. In the base station according to the above characteristic, the neighboring base station load information includes first neighboring base station load information newly received by the network communication unit, and the control unit performs control to switch the radio communication unit from the low power consumption mode to the power-off mode, when the first neighboring base station load information falls below a fourth threshold value.

Another characteristic of the base station according to the present invention is summarized as follows. The base station according to the above characteristic further comprises a storage unit, wherein the neighboring base station load information includes second neighboring base station load information stored in the storage unit according to conditions, which is neighboring base station load information obtained in a past by the network communication unit, and the control unit, even in a case in which the first neighboring base station load information falls below the fourth threshold value, performs control such that the radio communication unit is not switched from the low power consumption mode to the power-off mode, when a difference between the first neighboring base station load information and the second neighboring base station load information under the same condition as a condition of the first neighboring base station load information is equal to or larger than a predetermined value, or when the second neighboring base station load information under the same condition as the condition of the first neighboring base station load information exceeds the fourth threshold value.

A characteristic of a control method according to the present invention is summarized as follows. The control method of a base station, which is adjacent to a macro base station and used in a cellular mobile communication system, comprises: a step of performing control to switch a power consumption state of a radio communication unit provided in the base station on the basis of neighboring base station load information on a traffic load of a macro base station adjacent to the base station.

BRIEF DESCRIPTION OF THE DRAWINGS

FIG. 14 is a flowchart illustrating an operation flow in the low power consumption mode 2 according to the second embodiment.

DESCRIPTION OF THE EMBODIMENT

Figure 1:
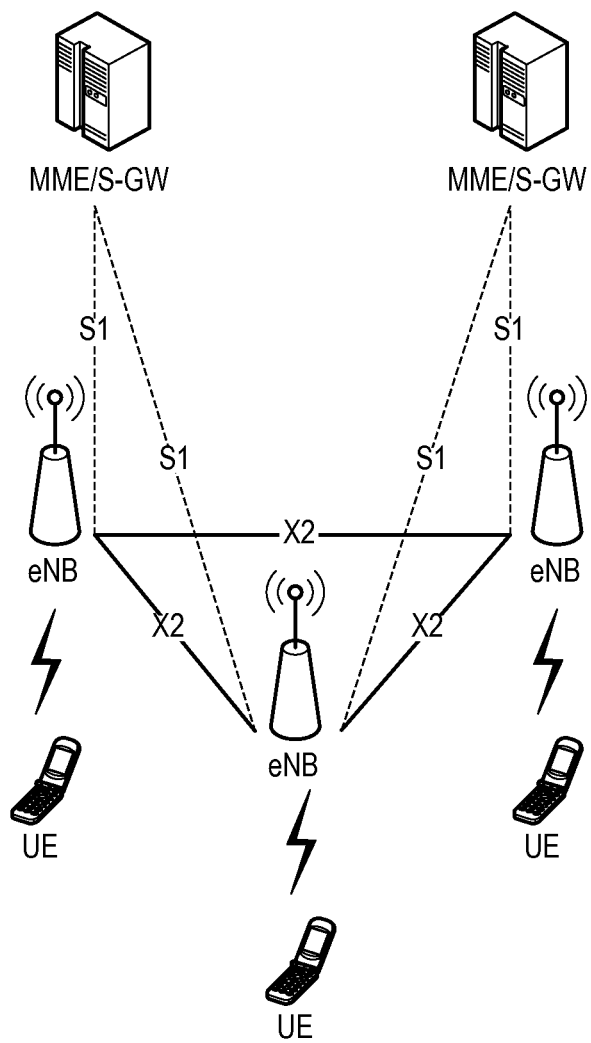
FIG. 1 is a network configuration diagram illustrating a network configuration of a cellular mobile communication system according to a first embodiment and a second embodiment of the present invention.

With reference to the drawings, a first embodiment, a second embodiment, and other embodiments of the present invention will be described. In the drawings of each of the following embodiments, the same or similar reference sign is applied to the same or similar part.

In each of the following embodiments, a description will be provided for a cellular mobile communication system, which is configured on the basis of LTE (Long Term Evolution) standards having specifications designed in 3GPP (3rd Generation Partnership Project). However, the present invention may be applied to a cellular mobile communication system configured on the basis of other standards.

Furthermore, in the following embodiments, a description will be provided for a micro base station as an example of a base station according to the present invention. However, as well as the micro base station, a pico base station or a femto base station may be used as the base station according to the present invention.

(1) First Embodiment

Hereinafter, a first embodiment will be described in the sequence of (1.1) Overview of LTE system, (1.2) Configuration of micro base station, (1.3) Mode switching operation, (1.4) Effect of first embodiment, and (1.5) Other embodiments.

(1.1) Overview of LTE System

FIG. 1 is a network configuration diagram illustrating a network configuration of a cellular mobile communication system 1 according to a first embodiment.

As illustrated in FIG. 1, the cellular mobile communication system 1 includes a radio terminal UE (User Equipment), a plurality of radio base stations eNB (evolved Node-B), and a plurality of mobility management devices MME (Mobility Management Entity)/gateway devices S-GW (Serving Gateway).

The plurality of radio base stations eNB constitute E-UTRAN (Evolved-UMTS Terrestrial Radio Access Network). Each of the plurality of radio base stations eNB manages a cell that is a communication area where a service should be provided to the radio terminal UE. The radio terminal UE is a radio communication device owned by a user, and is also called as "User Equipment".

Each of the adjacent radio base stations eNB can communicate mutually via an X2 interface which is a logical communication channel to provide inter-base-station communication. Furthermore, each of the plurality of radio base stations eNB can communicate with EPC (Evolved Packet Core), specifically, the MME/S-GW, via an S1 interface.

Figure 2:
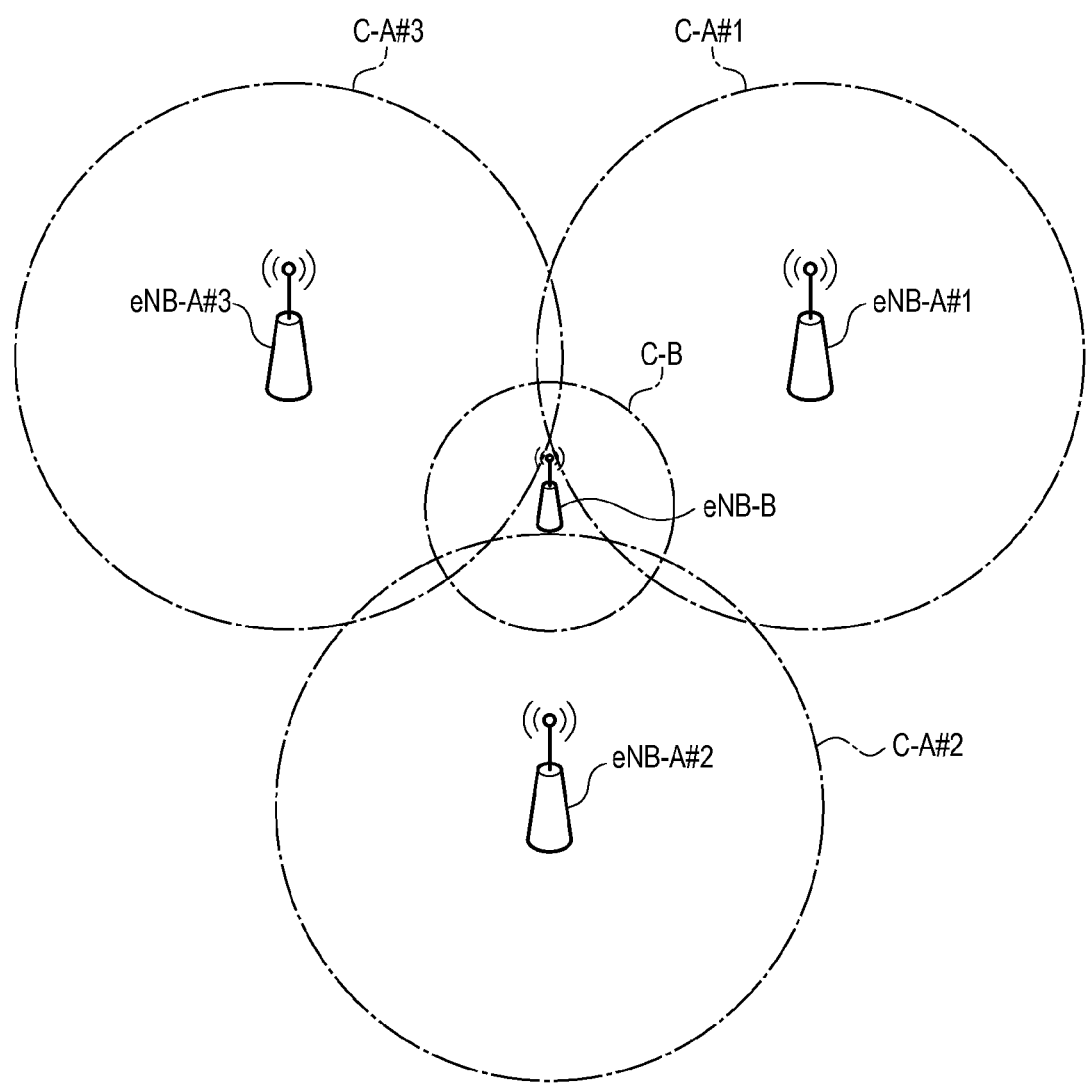
FIG. 2 is a diagram illustrating an example of an environment in which a micro base station is installed according to a first embodiment and a second embodiment of the present invention.

FIG. 2 is a diagram illustrating an example of an environment in which a micro base station eNB-B is installed. The micro base station eNB-B is a radio base station configured to be smaller than a macro base station eNB-A and having maximum transmission power lower than that of the macro base station eNB-A.

As illustrated in FIG. 2, the micro base station eNB-B is installed in an area not covered by the macro base station eNB-A. Specifically, the micro base station eNB-B is installed adjacent to each of a macro base station eNB-A #1, a macro base station eNB-A #2, and a macro base station eNB-A #3.

The micro base station eNB-B plays a role of complementing an area not covered by any one of a cell C-A #1 of the macro base station eNB-A #1, a cell C-A #2 of the macro base station eNB-A #2, and a cell C-A #3 of the macro base station eNB-A #3.

In addition, the micro base station eNB-B is a micro base station with non-divided sectors, that is, a micro omni-base station. The micro base station eNB-B manages one communication area (that is, a cell C-B). The macro base station eNB-A adjacent to the micro base station eNB-B (hereinafter, referred to as a neighboring macro base station eNB-A) has divided sectors and manages a plurality of communication areas (sectors).

(1.2) Configuration of Micro Base Station

Figure 3:
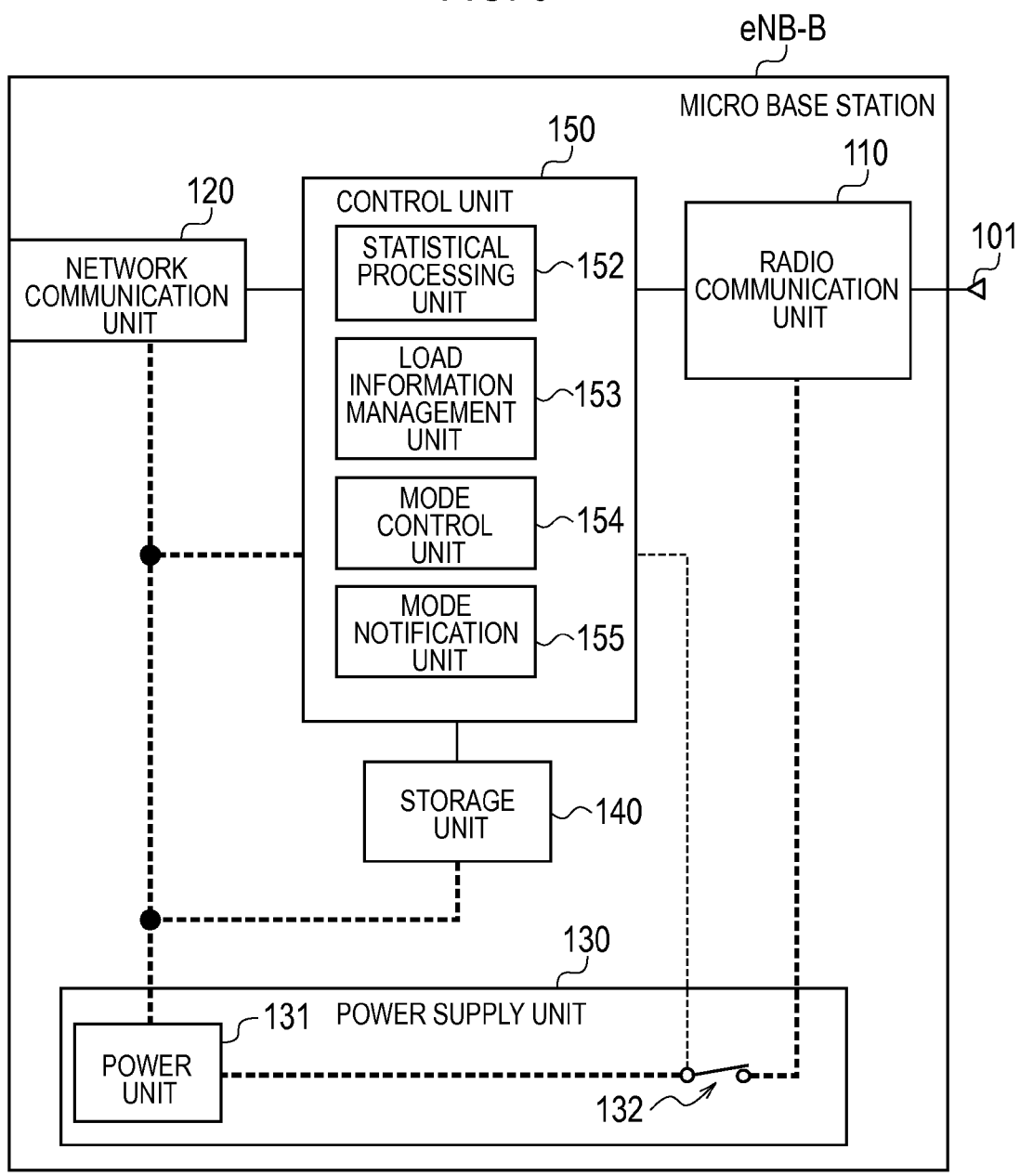
FIG. 3 is a block diagram illustrating the configuration of the micro base station according to a first embodiment and a second embodiment of the present invention.

Next, the configuration of the micro base station eNB-B according to a first embodiment will be described. FIG. 3 is a block diagram illustrating the configuration of the micro base station eNB-B.

(1.2.1) Schematic Configuration of Micro Base Station

As illustrated in FIG. 3, the micro base station eNB-B includes an antenna 101, a radio communication unit 110, a network communication unit 120, a power supply unit 130, a storage unit 140, and a control unit 150. The antenna 101 is connected to the radio communication unit 110, and each of the radio communication unit 110, the network communication unit 120, and the storage unit 140 is connected to the control unit 150.

The antenna 101 is used for transmitting and receiving a radio signal. The antenna 101 may be configured using a plurality of antenna elements.

The radio communication unit 110, for example, is configured using a radio frequency (RF) circuit or a signal processing circuit, and is configured to perform radio communication through the antenna 101.

For transmission, the radio communication unit 110 performs coding and modulation of a transmitted signal that is input from the control unit 150, performs up-converting and amplification for the modulated signal, and then outputs the amplified signal to the antenna 101. For reception, the radio communication unit 110 performs amplification and down-converting of a received signal that is input from the antenna 101, performs demodulation and decoding for the converted signal, and then outputs the demodulated signal to the control unit 150.

The network communication unit 120 communicates with the neighboring macro base station eNB-A using the X2 interface, and communicates with the MME/SG-W using the S1 interface.

The network communication unit 120 receives neighboring base station load information using the X2 interface. The neighboring base station load information is information on the traffic load of the neighboring macro base station eNB-A. The network communication unit 120 receives the neighboring base station load information at a predetermined time interval (for example, an interval of 5 minutes).

As the neighboring base station load information, for example, one of the following load information items (a) to (d) defined in LTE is available (for example, refer to 3GPP TS 36.423 "9.1.2.14 RESOURCE STATUS UPDATE").

(a) Radio Resource Status indicating the number of used PRBs (Physical Resource Blocks) that is an assignment unit of a time and frequency resource, (b) S1 TNL Load Indicator indicating the load of a backhaul between a radio base station and a core network, (c) Hardware Load Indicator indicating the hardware load of a radio base station, and (d) Composite Available Capacity Group indicating a ratio of available communication capacity to a capacity class that is an index indicating relative communication capacity of a radio base station.

However, in addition to the case in which these types of information is used as the neighboring base station load information, a new message or an information element, which notifies the amount of traffic (that is, a data amount) transmitted/received by a radio base station, may be defined, and may be used as the neighboring base station load information.

The power supply unit 130 supplies power to each block of the micro base station eNB-B. The power supply unit 130 includes a power unit 131 and a power switch unit 132.

The power unit 131 is connected to the network communication unit 120, the storage unit 140, and the control unit 150, and supplies power to the network communication unit 120, the storage unit 140, and the control unit 150.

The power switch unit 132 is provided on a power supply path between the radio communication unit 110 and the power unit 131, and is connected to the radio communication unit 110 and the power unit 131. The power switch unit 132 is turned on/off in response to a control signal from the control unit 150. When the power switch unit 132 is turned on, the power from the power unit 131 is supplied to the radio communication unit 110, and when the power switch unit 132 is turned off, the power from the power unit 131 is not supplied to the radio communication unit 110.

In addition, since the radio communication unit 110 is a block having the highest power consumption among the blocks of the micro base station eNB-B, when the power supplied to the radio communication unit 110 is reduced or stopped, it is possible to significantly reduce the power consumption of the micro base station eNB-B.

The storage unit 140, for example, is configured using a memory and stores various types of information used for control and the like of the micro base station eNB-B. The control unit 150, for example, is configured using a CPU, and controls various functions of the micro base station eNB-B.

The control unit 150 performs control to switch a power consumption state of the radio communication unit 110 on the basis of the neighboring base station load information received in the network communication unit 120.

In the first embodiment, the power consumption state includes a power-off mode in which the operation of the radio communication unit 110 is stopped, a low power consumption mode in which the radio communication unit 110 operates in a low power consumption state, and a high power consumption mode in which the radio communication unit 110 operates in a high power consumption state.

In the power-off mode, the control unit 150 controls the power switch unit 132 such that the supply of the power to the radio communication unit 110 is stopped.

When the power-off mode is switched to the low power consumption mode, the control unit 150 controls the power switch unit 132 such that the supply of the power to the radio communication unit 110 is stopped, and sets a transmission power level of the radio communication unit 110 to a low level.

When the low power consumption mode is switched to the high power consumption mode, the control unit 150 sets the transmission power level of the radio communication unit 110 to a high level (that is, a normal level).

In addition, the power consumption of the radio communication unit 110 is decreased in the sequence of the high power consumption mode, the low power consumption mode, and the power-off mode.

(1.2.2) Details of Control Unit

Next, details of the control unit 150 will be described. The control unit 150 includes a statistical processing unit 152, a load information management unit 153, a mode control unit 154, and a mode notification unit 155. Each function of the statistical processing unit 152, the load information management unit 153, the mode control unit 154, and the mode notification unit 155, for example, is performed when CPU serving as the control unit 150 executes a control program stored in the storage unit 140.

The statistical processing unit 152 statistically processes neighboring base station load information (hereinafter, current neighboring base station load information) newly received by the network communication unit 120. The statistical processing, for example, is a process of averaging neighboring base station load information received by the network communication unit 120 from a plurality of neighboring macro base stations eNB-A.

The load information management unit 153 manages neighboring base station load information (hereinafter, past neighboring base station load information), which was obtained in the past, according to conditions. The conditions, for example, include conditions such as a season, a day, a time zone, holiday or not, or a condition indicating whether there is an event in the cell C-B of the micro base station eNB-B. The past neighboring base station load information is stored in the storage unit 140, and is updated by the load information management unit 153.

The mode control unit 154 switches the power consumption state (that is, the high power consumption mode, the low power consumption mode, and the power-off mode) of the radio communication unit 110 on the basis of the current neighboring base station load information received by the network communication unit 120 and the past neighboring base station load information stored in the storage unit 140. Details of the mode switching operation will be described later.

When the mode switching is performed by the mode control unit 154, the mode notification unit 155 controls the network communication unit 120 such that a mode after the switching is notified to the neighboring macro base stations eNB-A. For the notification of the switching to the power-off mode, Deactivation Indication IE of an eNB Configuration Update message defined in LTE is available (for example, refer to 3GPP TS 36.423"8.3.5 eNB Configuration Update"). For the mode switching to the high power consumption mode or the low power consumption mode, a new message is defined or a new information element is defined in the eNB Configuration Update message, so that the switching may be notified to the neighboring macro base stations eNB-A.

(1.3) Mode Switching Operation

Next, with reference to FIG. 4, (1.3.1) Overview of mode switching operation and (1.3.2) Details of mode switching operation will be described.

(1.3.1) Overview of Mode Switching Operation

Figure 4A:
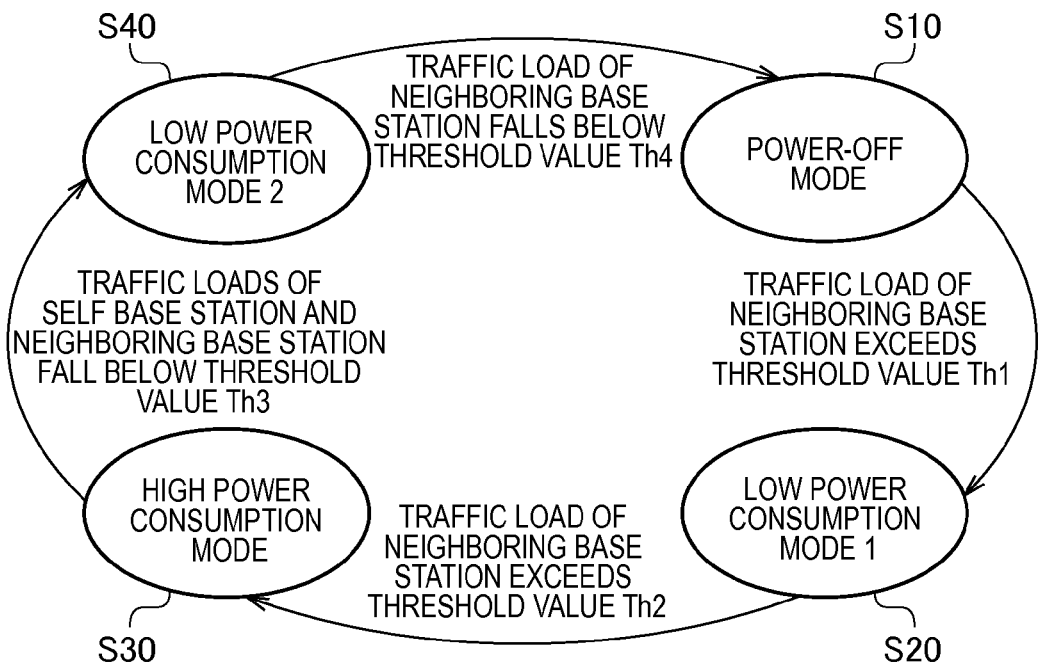
FIG. 4(a) is a diagram illustrating state transition among modes according to a first embodiment of the present invention.

FIG. 4(*a*) is a diagram illustrating state transition among modes.

As illustrated in FIG. 4(*a*), in step S10, the mode control unit 154 sets the radio communication unit 110 to the power-off mode.

In step S10, the mode control unit 154 controls the radio communication unit 110 to be switched from the power-off mode to a low power consumption mode 1 on the basis of the traffic load of the neighboring macro base station eNB-A, that is, the current neighboring base station load information. Specifically, when the current neighboring base station load information exceeds a threshold value Th1, the mode control unit 154 switches the radio communication unit 110 from the power-off mode to the low power consumption mode 1.

In this way, when the traffic load of the neighboring macro base station eNB-A increases, it is possible to return the radio communication unit 110 from the power-off mode and to absorb the traffic load of the neighboring macro base station eNB-A. Furthermore, the radio communication unit 110 is switched to the low power consumption mode 1 when returned from the power-off mode, so that it is possible to suppress an increase in the power consumption of the micro base station eNB-B.

However, even when the current neighboring base station load information exceeds the threshold value Th1, if the difference between the current neighboring base station load information and the past neighboring base station load information under the same conditions as those of the current neighboring base station load information is equal to or larger than a predetermined value, or if the past neighboring base station load information under the same conditions as those of the current neighboring base station load information falls below the threshold value Th1, the mode control unit 154 performs control such that the radio communication unit 110 is not switched from the power-off mode to the low power consumption mode 1.

As described above, for example, even when the current neighboring base station load information exceeds the threshold value Th1, if the past neighboring base station load information is within a time zone in which the past neighboring base station load information is not increased over the threshold value Th1, the mode control unit 154 regards a change in the current neighboring base station load information as an accidental and temporary change, and performs control such that the radio communication unit 110 is not switched from the power-off mode to the low power consumption mode 1. In this way, it is possible to achieve stable control.

In step S20, the mode control unit 154 sets the radio communication unit 110 to the low power consumption mode 1.

In step S20, the mode control unit 154 performs control such that the radio communication unit 110 is switched from the low power consumption mode 1 to the high power consumption mode, on the basis of the traffic load of the neighboring macro base station eNB-A, that is, the current neighboring base station load information. Specifically, when the current neighboring base station load information exceeds a threshold value Th2, the mode control unit 154 switches the radio communication unit 110 from the low power consumption mode 1 to the high power consumption mode. In addition, the threshold value Th2 is larger than the threshold value Th1 (refer to FIG. 4(*b*)).

As described above, when the traffic load of the neighboring macro base station eNB-A further increases, the switching is performed from the low power consumption mode to the high power consumption mode, so that it is possible to further absorb the traffic load of the neighboring macro base station eNB-A, and thus to provide a reliable service to the radio terminal UE.

However, even when the current neighboring base station load information exceeds the threshold value Th2, if the difference between the current neighboring base station load information and the past neighboring base station load information under the same conditions as those of the current neighboring base station load information is equal to or larger than a predetermined value, or if the past neighboring base station load information under the same conditions as those of the current neighboring base station load information falls below the threshold value Th2, the mode control unit 154 performs control such that the radio communication unit 110 is not switched from the low power consumption mode 1 to the high power consumption mode.

As described above, for example, even when the current neighboring base station load information exceeds the threshold value Th2, if the past neighboring base station load information is within a time zone in which the past neighboring base station load information is not increased over the threshold value Th2, the mode control unit 154 regards a change in the current neighboring base station load information as an accidental and temporary change, and performs control such that the radio communication unit 110 is not switched from the low power consumption mode 1 to the high power consumption mode. In this way, it is possible to achieve stable control.

In step S30, the mode control unit 154 sets the radio communication unit 110 to the high power consumption mode.

In step S30, the mode control unit 154 performs control such that the radio communication unit 110 is switched from the high power consumption mode to a low power consumption mode 2, on the basis of the traffic load of the neighboring macro base station eNB-A, that is, the current neighboring base station load information. Specifically, when the current neighboring base station load information falls below a threshold value Th3, the mode control unit 154 switches the radio communication unit 110 from the high power consumption mode to the low power consumption mode 2. In addition, the threshold value Th3 is larger than the threshold value Th1 and is different from or equal to the threshold value Th2 (refer to FIG. 4(b)). Furthermore, the power consumption in the low power consumption mode 2 has a level equal to that of the power consumption in the low power consumption mode 1.

As described above, when the traffic load of the neighboring macro base station eNB-A decreases, the mode control unit 154 switches the radio communication unit 110 from the high power consumption mode to the low power consumption mode 2, so that it is possible to reduce the power consumption of the micro base station eNB-B.

However, even when the current neighboring base station load information falls below the threshold value Th3, if the difference between the current neighboring base station load information and the past neighboring base station load information under the same conditions as those of the current neighboring base station load information is equal to or larger than a predetermined value, or if the past neighboring base station load information under the same conditions as those of the current neighboring base station load information exceeds the threshold value Th3, the mode control unit 154 performs control such that the radio communication unit 110 is not switched from the high power consumption mode to the low power consumption mode 2.

As described above, for example, even when the current neighboring base station load information falls below the threshold value Th3, if the past neighboring base station load information is within a time zone in which the past neighboring base station load information is not decreased any further, the mode control unit 154 regards a change in the current neighboring base station load information as an accidental and temporary change, and performs control such that the radio communication unit 110 is not switched from high power consumption mode to the low power consumption mode 2. In this way, it is possible to achieve stable control.

In step S40, the mode control unit 154 sets the radio communication unit 110 to the low power consumption mode 2.

In step S40, the mode control unit 154 performs control such that the radio communication unit 110 is switched from the low power consumption mode 2 to the power-off mode, on the basis of the traffic load of the neighboring macro base station eNB-A, that is, the current neighboring base station load information. Specifically, when the current neighboring base station load information falls below a threshold value Th4, the mode control unit 154 switches the radio communication unit 110 from the low power consumption mode 2 to the power-off mode. In addition, the threshold value Th4 is smaller than the threshold value Th2 and the threshold value Th3, and is different from or equal to the threshold value Th1 (refer to FIG. 4(b)).

As described above, when the traffic load of the neighboring macro base station eNB-A further decreases, the mode control unit 154 switches the radio communication unit 110 from the low power consumption mode 2 to the power-off mode, so that it is possible to further reduce the power consumption of the micro base station eNB-B.

However, even when the current neighboring base station load information falls below the threshold value Th4, if the difference between the current neighboring base station load information and the past neighboring base station load information under the same conditions as those of the current neighboring base station load information is equal to or larger than a predetermined value, or if the past neighboring base station load information under the same conditions as those of the current neighboring base station load information exceeds the threshold value Th4, the mode control unit 154 performs control such that the radio communication unit 110 is not switched from the low power consumption mode 2 to the power-off mode.

As described above, for example, even when the current neighboring base station load information falls below the threshold value Th4, if the past neighboring base station load information is within a time zone in which the past neighboring base station load information is not decreased any further, the mode control unit 154 regards a change in the current neighboring base station load information as an accidental and temporary change, and performs control such that the radio communication unit 110 is not switched from low power consumption mode 2 to the power-off mode. In this way, it is possible to achieve stable control.

Figure 4B:
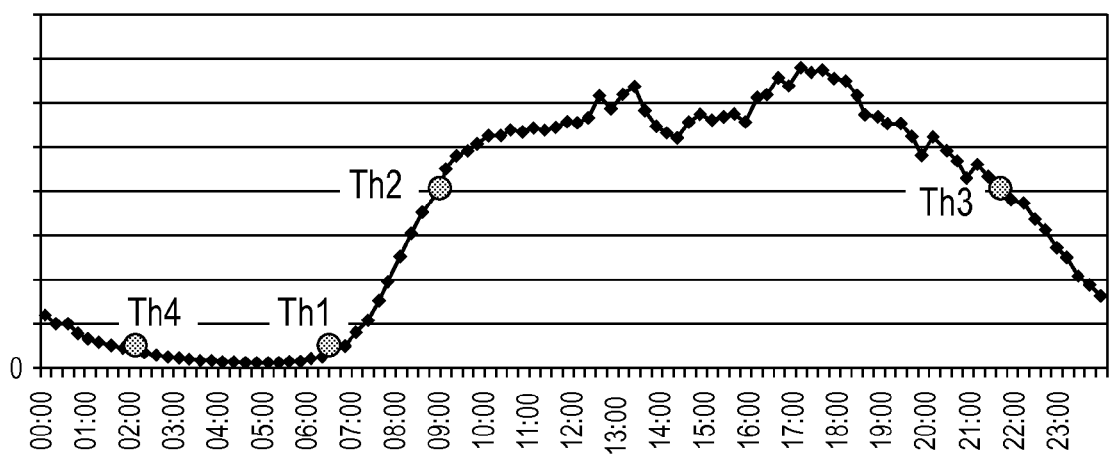
FIG. 4(b) is a diagram illustrating traffic transition in one day.

FIG. 4(b) is a diagram illustrating traffic transition in one day.

As illustrated in FIG. 4(b), it can be understood that traffic is high in a time zone in which a person makes action from morning to daytime and night, but traffic at nighttime is excessively decreased.

In the vicinity of 2:00, the mode control unit 154 detects that the current neighboring base station load information falls below the threshold value Th4. In the case in which the current neighboring base station load information falls below the threshold value Th4, when the past neighboring base station load information under the same conditions as those of the current neighboring base station load information also falls below the threshold value Th4, the mode control unit 154 switches the radio communication unit 110 from the low power consumption mode 2 to the power-off mode.

In the vicinity of 6:00, the mode control unit 154 detects that the current neighboring base station load information exceeds the threshold value Th1. In the case in which the current neighboring base station load information exceeds the threshold value Th1, when the past neighboring base station load information under the same conditions as those of the current neighboring base station load information exceeds the threshold value Th1, the mode control unit 154 switches the radio communication unit 110 from the power-off mode to the low power consumption mode 1.

In the vicinity of 9:00, the mode control unit 154 detects that the current neighboring base station load information exceeds the threshold value Th2. In the case in which the current neighboring base station load information exceeds the threshold value Th2, when the past neighboring base station load information under the same conditions as those of the current neighboring base station load information exceeds the threshold value Th2, the mode control unit 154 switches the radio communication unit 110 from the low power consumption mode 1 to the high power consumption mode.

In the vicinity of 21:00, the mode control unit 154 detects that the current neighboring base station load information falls below the threshold value Th3. In the case in which the current neighboring base station load information falls below the threshold value Th3, when the past neighboring base station load information under the same conditions as those of the current neighboring base station load information falls below the threshold value Th3, the mode control unit 154 switches the radio communication unit 110 from the high power consumption mode to the low power consumption mode 2.

(1.3.2) Details of Mode Switching Operation

Next, details of the mode switching operation will be described in the sequence of (1.3.2.1) Operation in the power-off mode, (1.3.2.2) Operation in low power consumption mode 1, (1.3.2.3) Operation in high power consumption mode, and (1.3.2.4) Operation in low power consumption mode 2. A description for a process using the aforementioned past neighboring base station load information will be omitted.

(1.3.2.1) Operation in Power-Off Mode

Figure 5:
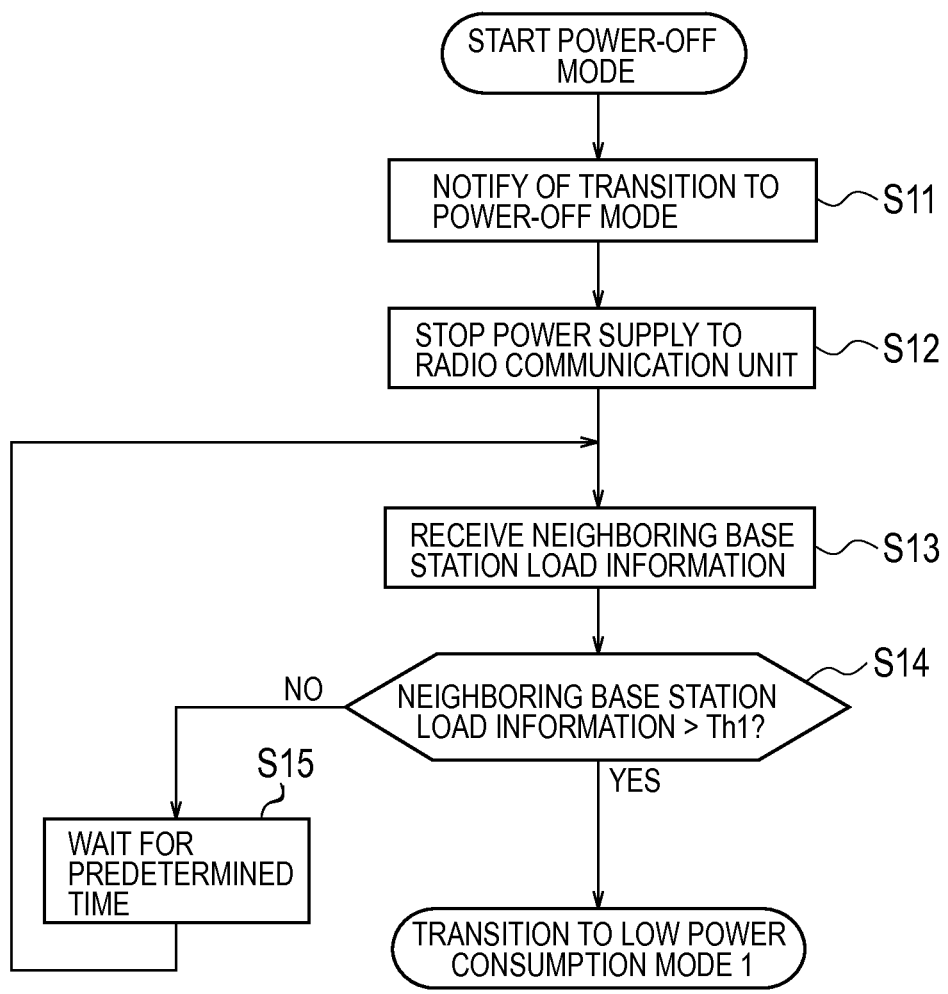
FIG. 5 is a flowchart illustrating an operation flow in the power-off mode according to a first embodiment of the present invention.

FIG. 5 is a flowchart illustrating an operation flow in the power-off mode.

As illustrated in FIG. 5, when the power-off mode is started, the mode notification unit 155 controls the network communication unit 120 such that notification indicating the switching to the power-off mode is transmitted to the neighboring macro base station eNB-A, in step S11.

In step S12, the mode control unit 154 controls the power switch unit 132 such that the supply of power to the radio communication unit 110 is stopped. Specifically, the mode control unit 154 outputs a control signal to turn off the power switch unit 132 to the power switch unit 132.

In step S13, the network communication unit 120 receives the current neighboring base station load information from the neighboring macro base station eNB-A. When the network communication unit 120 receives a plurality of types of current neighboring base station load information from a plurality of neighboring macro base stations eNB-A, the statistical processing unit 152 averages these neighboring base station load information.

In step S14, the mode control unit 154 confirms whether the current neighboring base station load information exceeds the threshold value Th1. When the current neighboring base station load information exceeds the threshold value Th1, the current mode is transitioned to the low power consumption mode 1. Meanwhile, when the current neighboring base station load information is equal to or smaller than the threshold value Th1, the procedure proceeds to step S15, the mode control unit 154 waits for a predetermined time (for example, five minutes) in step S15. Then, the procedure returns to step S13.

(1.3.2.2) Operation in Low Power Consumption Mode 1

Figure 6:
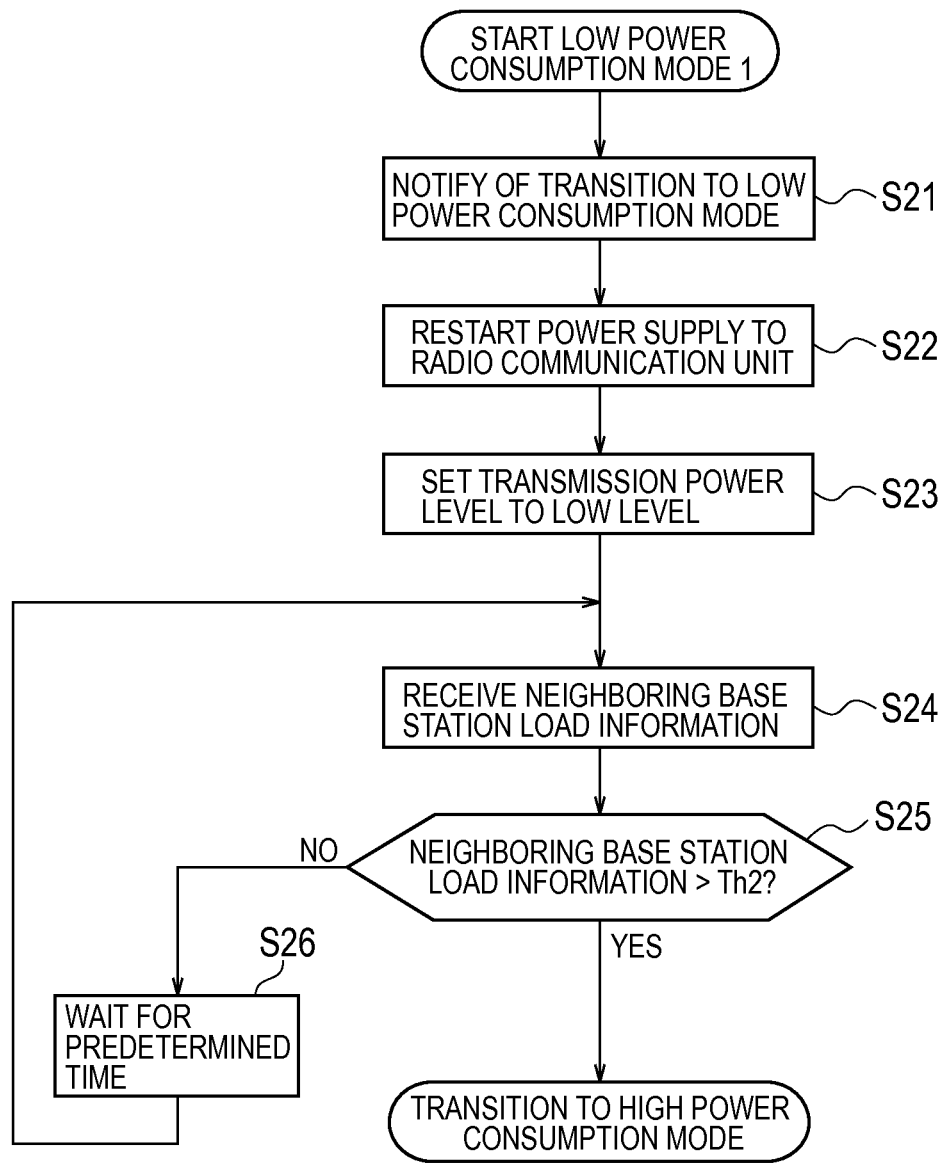
FIG. 6 is a flowchart illustrating an operation flow in the low power consumption mode 1 according to a first embodiment of the present invention.

FIG. 6 is a flowchart illustrating an operation flow in the low power consumption mode 1.

As illustrated in FIG. 6, when the low power consumption mode 1 is started, the mode notification unit 155 controls the network communication unit 120 such that notification indicating the switching to the low power consumption mode is transmitted to the neighboring macro base station eNB-A, in step S21.

In step S22, the mode control unit 154 controls the power switch unit 132 such that the supply of power to the radio communication unit 110 is restarted. Specifically, the mode control unit 154 outputs a control signal to turn on the power switch unit 132 to the power switch unit 132.

In step S23, the mode control unit 154 sets a transmission power level of the radio communication unit 110 to a low level. For example, the mode control unit 154 performs setting such that the transmission power level of the radio communication unit 110 is limited to about the half of a maximum transmission power level.

In step S24, the network communication unit 120 receives the current neighboring base station load information from the neighboring macro base station eNB-A. When the network communication unit 120 receives a plurality of types of current neighboring base station load information from a plurality of neighboring macro base stations eNB-A, the statistical processing unit 152 averages these neighboring base station load information.

In step S25, the mode control unit 154 confirms whether the current neighboring base station load information exceeds the threshold value Th2. When the current neighboring base station load information exceeds the threshold value Th2, the current mode is transitioned to the high power consumption mode. Meanwhile, when the current neighboring base station load information is equal to or smaller than the threshold value Th2, the procedure proceeds to step S26, the mode control unit 154 waits for a predetermined time (for example, five minutes) in step S26. Then, the procedure returns to step S24.

(1.3.2.3) Operation in High Power Consumption Mode

Figure 7:
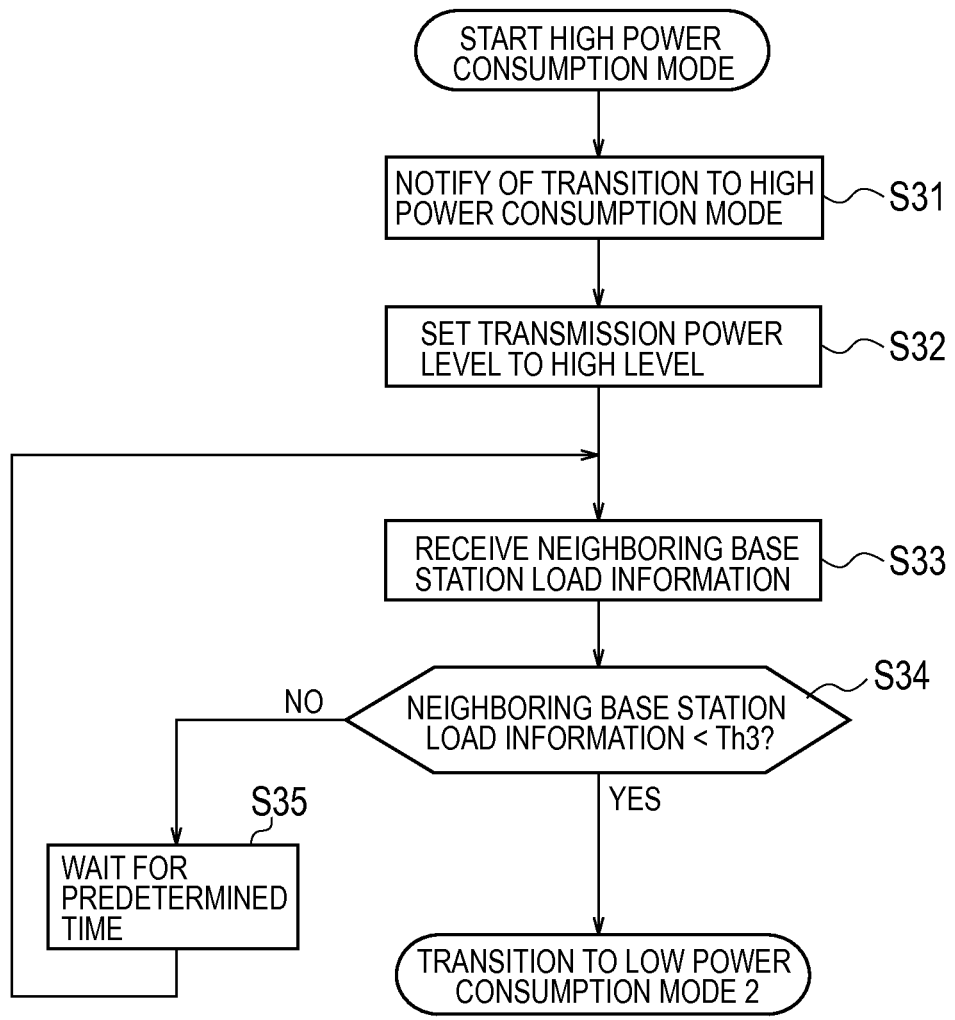
FIG. 7 is a flowchart illustrating an operation flow in the high power consumption mode according to a first embodiment of the present invention.

FIG. 7 is a flowchart illustrating an operation flow in the high power consumption mode.

As illustrated in FIG. 7, when the high power consumption mode is started, the mode notification unit 155 controls the network communication unit 120 such that notification indicating the switching to the high power consumption mode is transmitted to the neighboring macro base station eNB-A, in step S31.

In step S32, the mode control unit 154 sets the transmission power level of the radio communication unit 110 to a high level. For example, the mode control unit 154 performs setting such that the transmission power level of the radio communication unit 110 is permitted to the maximum transmission power level.

In step S33, the network communication unit 120 receives the current neighboring base station load information from the neighboring macro base station eNB-A. When the network communication unit 120 receives a plurality of types of current neighboring base station load information from a plurality of neighboring macro base stations eNB-A, the statistical processing unit 152 averages these neighboring base station load information.

In step S34, the mode control unit 154 confirms whether the current neighboring base station load information falls below the threshold value Th3. When the current neighboring base station load information falls below the threshold value Th3, the current mode is transitioned to the low power consumption mode 2. Meanwhile, when the current neighboring base station load information is equal to or larger than the threshold value Th3, the procedure proceeds to step S35, the mode control unit 154 waits for a predetermined time (for example, five minutes) in step S35. Then, the procedure returns to step S33.

(1.3.2.4) Operation in Low Power Consumption Mode 2

Figure 8:
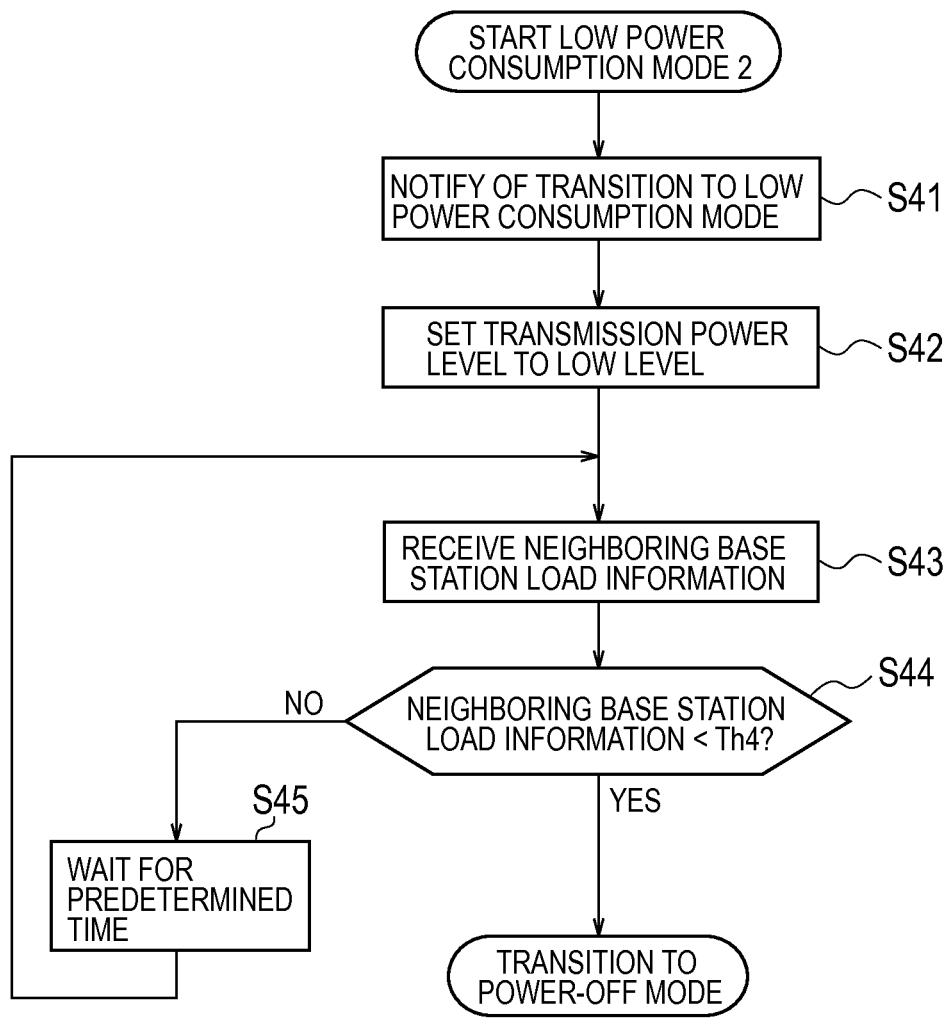
FIG. 8 is a flowchart illustrating an operation flow in the low power consumption mode 2 according to a first embodiment of the present invention.

FIG. 8 is a flowchart illustrating an operation flow in the low power consumption mode 2.

As illustrated in FIG. 8, when the low power consumption mode 2 is started, the mode notification unit 155 controls the network communication unit 120 such that notification indicating the switching to the low power consumption mode is transmitted to the neighboring macro base station eNB-A, in step S41.

In step S42, the mode control unit 154 sets the transmission power level of the radio communication unit 110 to a low level. For example, the mode control unit 154 performs setting such that the transmission power level of the radio communication unit 110 is limited to about the half of a maximum transmission power level.

In step S43, the network communication unit 120 receives the current neighboring base station load information from the neighboring macro base station eNB-A. When the network communication unit 120 receives a plurality of types of current neighboring base station load information from a plurality of neighboring macro base stations eNB-A, the statistical processing unit 152 averages these neighboring base station load information.

In step S44, the mode control unit 154 confirms whether the current neighboring base station load information falls below the threshold value Th4. When the current neighboring base station load information falls below the threshold value Th4, the current mode is transitioned to the power-off mode. Meanwhile, when the current neighboring base station load information is equal to or more than the threshold value Th4, the procedure proceeds to step S45, the mode control unit 154 waits for a predetermined time (for example, five minutes) in step S45. Then, the procedure returns to step S43.

(1.4) Effect of First Embodiment

As described above, the micro base station eNB-B according to the first embodiment performs control to switch the power consumption state of the radio communication unit 110 on the basis of the neighboring base station load information on the traffic load of the neighboring macro base station eNB-A.

In this way, when the traffic load of the neighboring macro base station eNB-A is high, it is possible to perform control prioritizing communication with the radio terminal UE over the reduction of power consumption. Meanwhile, when the traffic load of the neighboring macro base station eNB-A is low, it is possible to perform control prioritizing the reduction of power consumption over the communication with the radio terminal UE.

Consequently, in accordance with the micro base station eNB-B according to the first embodiment, it is possible to prevent the reduction of service quality while reducing power consumption.

In the first embodiment, the micro base station eNB-B performs control to switch the power consumption state of the radio communication unit 110 on the basis of the current neighboring base station load information received using inter-base-station communication. In this way, it is possible to acquire the current neighboring base station load information with low delay, and to perform control according to a change in a radio communication environment.

(2) Second Embodiment

Hereinafter, a second embodiment will be described in the sequence of (2.1) Configuration of micro base station, (2.2) Mode switching operation, and (2.3) Effect of second embodiment. However, differences from the first embodiment will be described and a redundant description will be omitted.

(2.1) Configuration of Micro Base Station

Figure 9:
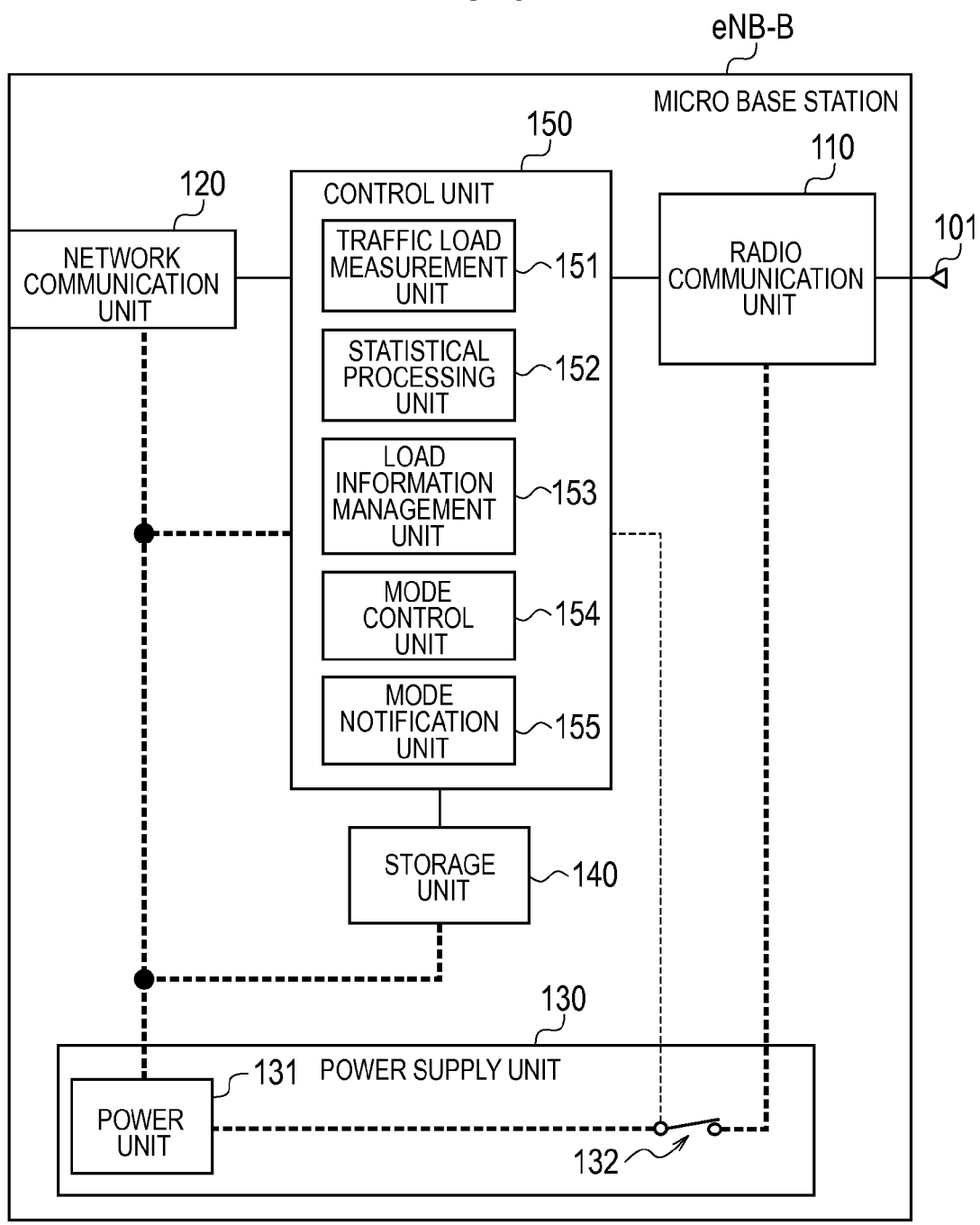
FIG. 9 is a block diagram illustrating the configuration of the micro base station eNB-B according to the second embodiment of the present invention.

FIG. 9 is a block diagram illustrating the configuration of the micro base station eNB-B according to the second embodiment.

As illustrated in FIG. 9, the control unit 150 of the micro base station eNB-B according to the second embodiment performs control to switch a power consumption state of the radio communication unit 110 on the basis of the neighboring base station load information received by the network communication unit 120, and self base station load information on the traffic load of the base station (that is, the micro base station eNB-B). Specifically, the control unit 150 is different from the first embodiment in that the control unit 150 further includes a traffic load measurement unit 151.

The traffic load measurement unit 151 measures the traffic load of the self base station and generates the self base station load information on the traffic load of the self base station. The self base station load information, for example, includes the number of used PRBs of the self base station, a communication load of the network communication unit 120, a hardware load of the control unit 150 and the storage unit 140, or the amount of traffic (that is, a data amount) transmitted/received by the self base station with respect to the radio terminal UE. The traffic load measurement unit 151 measures the traffic load of the self base station at a predetermined time interval (for example, five minutes), and generates the self base station load information.

The statistical processing unit 152 statistically processes the current neighboring base station load information received in the network communication unit 120 and self base station load information (hereinafter, current self base station load information) newly acquired by the traffic load measurement unit 151. The statistical process, for example, is a process of obtaining an average or a weighted average of the neighboring base station load information and the self base station load information. Hereinafter, a result obtained through the statistical processing of the neighboring base station load information and the self base station load information by the statistical processing unit 152 will be referred to as "statistical load information". Furthermore, the statistical processing unit 152 also performs a process of averaging neighboring base station load information received in the network communication unit 120 from a plurality of neighboring macro base stations eNB-A.

The load information management unit 153 manages past neighboring base station load information, and statistical load information (hereinafter, past statistical load information), which was obtained in the past by the statistical processing unit 152, according to conditions. The conditions, for example, include conditions such as a season, a day, a time zone, a holiday or not, or a condition indicating whether there is an event in the cell C-B of the micro base station eNB-B. The past neighboring base station load information and the past statistical load information are stored in the storage unit 140, and are updated by the load information management unit 153.

The mode control unit 154 switches the power consumption state (that is, the high power consumption mode, the low power consumption mode, and the power-off mode) of the radio communication unit 110 on the basis of the current neighboring base station load information received in the network communication unit 120, the past neighboring base station load information stored in the storage unit 140, statistical load information (hereinafter, current statistical load information) newly obtained by the statistical processing unit 152, and the past statistical load information stored in the storage unit 140. Details of the mode switching operation will be described later.

The other configurations are same as those of the first embodiment.

(2.2) Mode Switching Operation

Next, (2.2.1) Overview of mode switching operation and (2.2.2) Details of mode switching operation will be described.

(2.2.1) Overview of Mode Switching Operation

Figure 10:
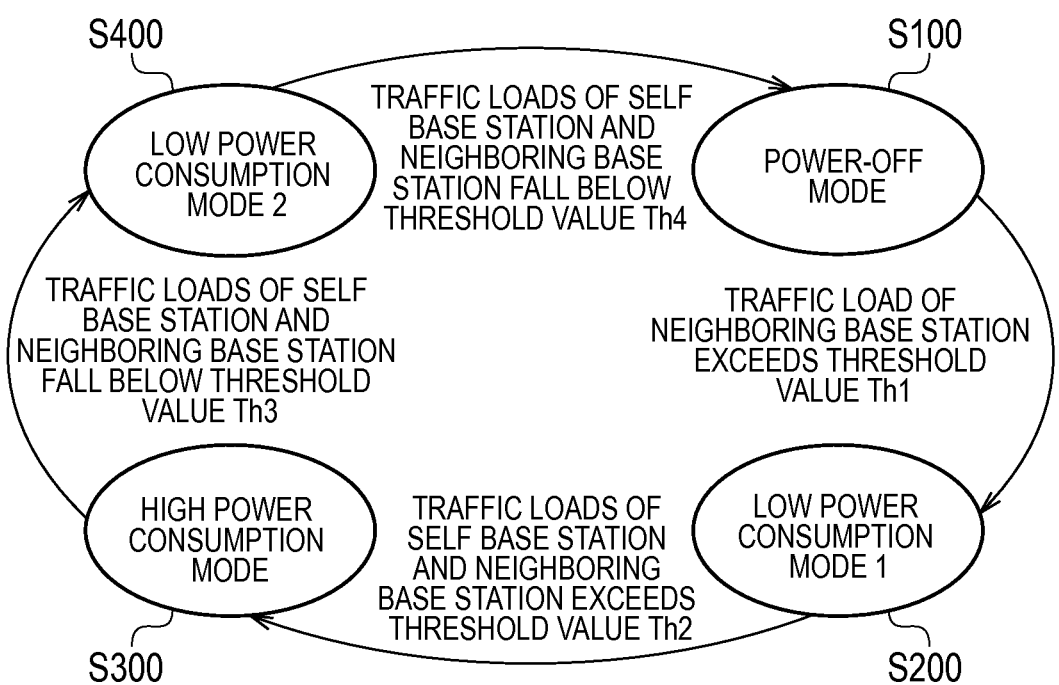
FIG. 10 is a diagram illustrating state transition among modes according to the second embodiment.

FIG. 10 is a diagram illustrating state transition among modes according to the second embodiment. The threshold values Th1 to Th4 illustrated in FIG. 10 are set in the same manner as those in the first embodiment.

As illustrated in FIG. 10, in step S100, the mode control unit 154 sets the radio communication unit 110 to the power-off mode.

In step S100, the mode control unit 154 controls the radio communication unit 110 to be switched from the power-off mode to the low power consumption mode 1 on the basis of the traffic load of the neighboring macro base station eNB-A, that is, the current neighboring base station load information. Specifically, when the current neighboring base station load information exceeds a threshold value Th1, the mode control unit 154 switches the radio communication unit 110 from the power-off mode to the low power consumption mode 1.

In this way, when the traffic load of the neighboring macro base station eNB-A increases, it is possible to return the radio communication unit 110 from the power-off mode and to absorb the traffic load of the neighboring macro base station eNB-A. Furthermore, the radio communication unit 110 is switched to the low power consumption mode 1 when returned from the power-off mode, so that it is possible to suppress an increase in the power consumption of the micro base station eNB-B.

However, even when the current neighboring base station load information exceeds the threshold value Th1, if the difference between the current neighboring base station load information and the past neighboring base station load information under the same conditions as those of the current neighboring base station load information is equal to or larger than a predetermined value, or if the past neighboring base station load information under the same conditions as those of the current neighboring base station load information falls below the threshold value Th1, the mode control unit 154 performs control such that the radio communication unit 110 is not switched from the power-off mode to the low power consumption mode 1.

As described above, when the current neighboring base station load information is significantly different from the past neighboring base station load information under the same conditions as those of the current neighboring base station load information, the mode control unit 154 regards a change in the current neighboring base station load information as an accidental and temporary change, and performs control such that the radio communication unit 110 is not switched from the power-off mode to the low power consumption mode 1. In this way, it is possible to achieve stable control.

In step S200, the mode control unit 154 sets the radio communication unit 110 to the low power consumption mode 1.

In step S200, the mode control unit 154 performs control such that the radio communication unit 110 is switched from the low power consumption mode 1 to the high power consumption mode, on the basis of the traffic load of the self base station and the neighboring macro base station eNB-A, that is, the current statistical load information.

Specifically, when the current statistical load information exceeds the threshold value Th2, the mode control unit 154 switches the radio communication unit 110 from the low power consumption mode 1 to the high power consumption mode.

As described above, when the traffic load of the self base station and the traffic load of the neighboring macro base station eNB-A further increase, the low power consumption mode is switched to the high power consumption mode, so that it is possible to provide a reliable service to the radio terminal UE.

However, even when the current statistical load information exceeds the threshold value Th2, if the difference between the current statistical load information and the past statistical load information under the same conditions as those of the current statistical load information is equal to or larger than a predetermined value, or if the past statistical load information under the same conditions as those of the current statistical load information falls below the threshold value Th2, the mode control unit 154 performs control such that the radio communication unit 110 is not switched from the low power consumption mode 1 to the high power consumption mode.

As described above, when the current statistical load information is significantly different from the past statistical load information under the same conditions as those of the current statistical load information, the mode control unit 154 regards a change in the current statistical load information as an accidental and temporary change, and performs control such that the radio communication unit 110 is not switched from the low power consumption mode 1 to the high power consumption mode. In this way, it is possible to achieve stable control.

In step S300, the mode control unit 154 sets the radio communication unit 110 to the high power consumption mode.

In step S300, the mode control unit 154 performs control such that the radio communication unit 110 is switched from the high power consumption mode to the low power consumption mode 2, on the basis of the traffic load of the self base station and the neighboring macro base station eNB-A, that is, the current statistical load information. Specifically, when the current statistical load information falls below the threshold value Th3, the mode control unit 154 switches the radio communication unit 110 from the high power consumption mode to the low power consumption mode 2. In addition, the power consumption in the low power consumption mode 2 has a level equal to that of the power consumption in the low power consumption mode 1.

As described above, when the traffic load of the self base station and the traffic load of the neighboring macro base station eNB-A decrease, the mode control unit 154 switches the radio communication unit 110 from the high power consumption mode to the low power consumption mode 2, so that it is possible to reduce the power consumption of the micro base station eNB-B.

However, even when the current statistical load information falls below the threshold value Th3, if the difference between the current statistical load information and the past statistical load information under the same conditions as those of the current statistical load information is equal to or larger than a predetermined value, or if the past statistical load information under the same conditions as those of the current statistical load information exceeds the threshold value Th3, the mode control unit 154 performs control such that the radio communication unit 110 is not switched from the high power consumption mode to the low power consumption mode 2.

As described above, when the current statistical load information is significantly different from the past statistical load information under the same conditions as those of the current statistical load information, the mode control unit 154 regards a change in the current statistical load information as an accidental and temporary change, and performs control such that the radio communication unit 110 is not switched from the high power consumption mode to the low power consumption mode 2. In this way, it is possible to achieve stable control.

In step S400, the mode control unit 154 sets the radio communication unit 110 to the low power consumption mode 2.

In step S400, the mode control unit 154 performs control such that the radio communication unit 110 is switched from the low power consumption mode 2 to the power-off mode, on the basis of the traffic load of the self base station and the neighboring macro base station eNB-A, that is, the current statistical load information. Specifically, when the current statistical load information falls below the threshold value Th4, the mode control unit 154 switches the radio communication unit 110 from the low power consumption mode 2 to the power-off mode.

As described above, when the traffic load of the self base station and the traffic load of the neighboring macro base station eNB-A further decrease, the mode control unit 154 switches the radio communication unit 110 from the low power consumption mode 2 to the power-off mode, so that it is possible to further reduce the power consumption of the micro base station eNB-B.

However, even when the current statistical load information falls below the threshold value Th4, if the difference between the current statistical load information and the past statistical load information under the same conditions as those of the current statistical load information is equal to or larger than a predetermined value, or if the past statistical load information under the same conditions as those of the current statistical load information exceeds the threshold value Th4, the mode control unit 154 performs control such that the radio communication unit 110 is not switched from the low power consumption mode 2 to the power-off mode.

As described above, for example, even when the current statistical load information is significantly different from the past statistical load information under the same conditions as those of the current statistical load information, the mode control unit 154 regards a change in the current statistical load information as an accidental and temporary change, and performs control such that the radio communication unit 110 is not switched from the low power consumption mode 2 to the power-off mode. In this way, it is possible to achieve stable control.

Hereinafter, with reference to FIG. 4(b) again, a detailed example of transition among the modes will be described.

As illustrated in FIG. 4(b), in the vicinity of 2:00, the mode control unit 154 detects that the current statistical load information falls below the threshold value Th4. In the case in which the current statistical load information falls below the threshold value Th4, when the past statistical load information under the same conditions as those of the current statistical load information also falls below the threshold value Th4, the mode control unit 154 switches the radio communication unit 110 from the low power consumption mode 2 to the power-off mode.

In the vicinity of 6:00, the mode control unit 154 detects that the current neighboring base station load information exceeds the threshold value Th1. In the case in which the current neighboring base station load information exceeds the threshold value Th1, when the past neighboring base station load information under the same conditions as those of the current neighboring base station load information exceeds the threshold value Th1, the mode control unit 154 switches the radio communication unit 110 from the power-off mode to the low power consumption mode 1.

In the vicinity of 9:00, the mode control unit 154 detects that the current statistical load information exceeds the threshold value Th2. In the case in which the current statistical load information exceeds the threshold value Th2, when the past statistical load information under the same conditions as those of the current statistical load information also exceeds the threshold value Th2, the mode control unit 154 switches the radio communication unit 110 from the low power consumption mode 1 to the high power consumption mode.

In the vicinity of 21:00, the mode control unit 154 detects that the current statistical load information falls below the threshold value Th3. In the case in which the current statistical load information falls below the threshold value Th3, when the past statistical load information under the same conditions as those of the current statistical load information also falls below the threshold value Th3, the mode control unit 154 switches the radio communication unit 110 from the high power consumption mode to the low power consumption mode 2.

(2.2.2) Details of Mode Switching Operation

Next, details of the mode switching operation according to the second embodiment will be described in the sequence of (2.2.2.1) Operation in power-off mode, (2.2.2.2) Operation in low power consumption mode 1, (2.2.2.3) Operation in high power consumption mode, and (2.2.2.4) Operation in low power consumption mode 2.

(2.2.2.1) Operation in Power-Off Mode

Figure 11:
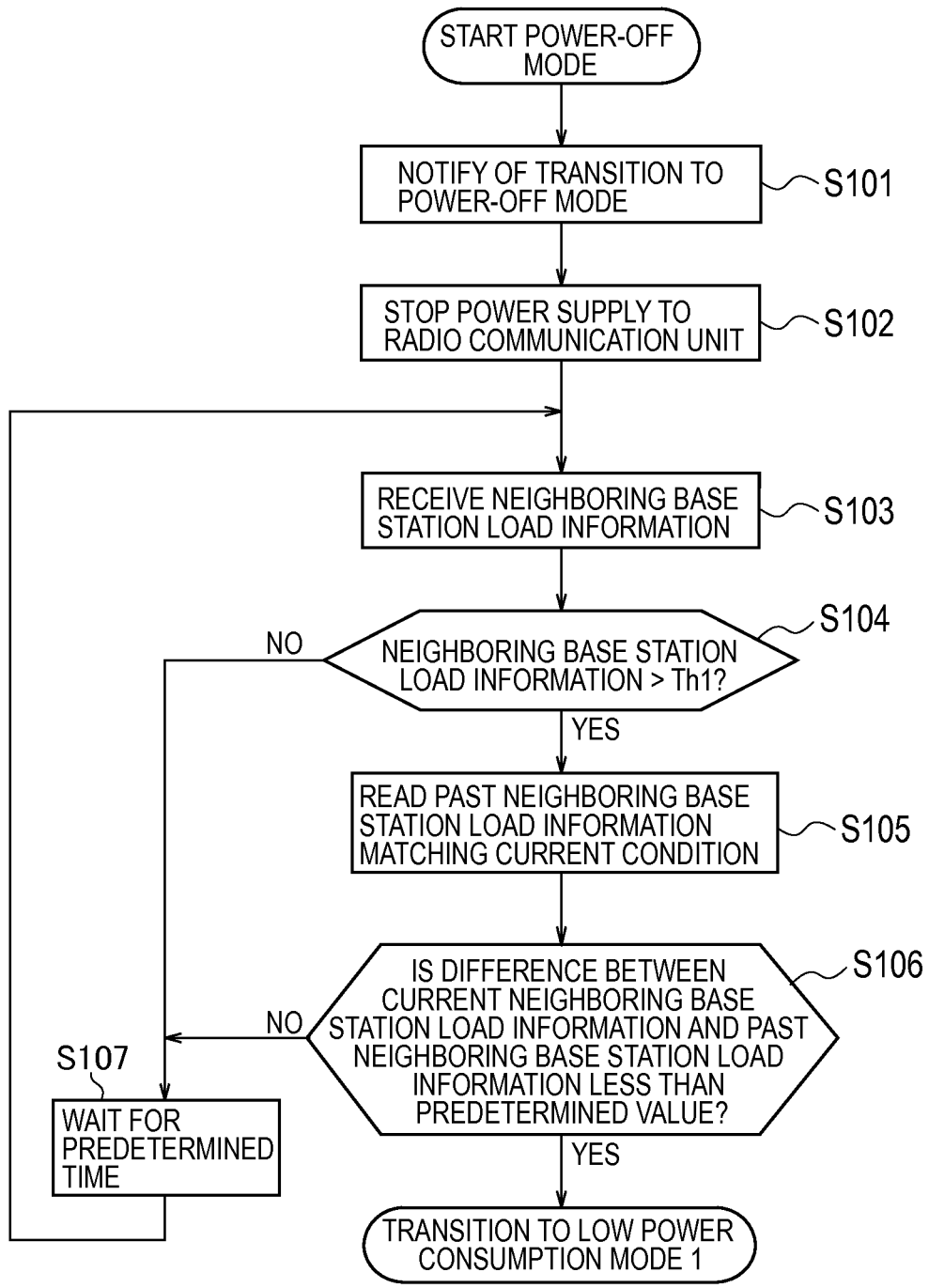
FIG. 11 is a flowchart illustrating an operation flow in the power-off mode according to the second embodiment.

FIG. 11 is a flowchart illustrating an operation flow in the power-off mode.

As illustrated in FIG. 11, when the power-off mode is started, the mode notification unit 155 controls the network communication unit 120 such that notification indicating the switching to the power-off mode is transmitted to the neighboring macro base station eNB-A, in step S101.

In step S102, the mode control unit 154 controls the power switch unit 132 such that the supply of power to the radio communication unit 110 is stopped. Specifically, the mode control unit 154 outputs a control signal to turn off the power switch unit 132 to the power switch unit 132.

In step S103, the network communication unit 120 receives the current neighboring base station load information from the neighboring macro base station eNB-A. When the network communication unit 120 receives a plurality of types of current neighboring base station load information from a plurality of neighboring macro base stations eNB-A, the statistical processing unit 152 averages these neighboring base station load information.

In step S104, the mode control unit 154 confirms whether the current neighboring base station load information exceeds the threshold value Th1. When the current neighboring base station load information exceeds the threshold value Th1, the procedure proceeds to step S105. Meanwhile, when the current neighboring base station load information is equal to or smaller than the threshold value Th1, the procedure proceeds to step S107, the mode control unit 154 waits for a predetermined time (for example, five minutes) in step S107. Then, the procedure returns to step S103.

In step S105, the load information management unit 153 reads the past neighboring base station load information under the same conditions as those of the current neighboring base station load information from the storage unit 140. Specifically, the load information management unit 153 searches for the past neighboring base station load information matching the current season or day and the current time zone from the storage unit 140, and reads a result of the search.

In step S106, the mode control unit 154 calculates the difference between the current neighboring base station load information and the past neighboring base station load information under the same conditions as those of the current neighboring base station load information, and confirms whether the difference is smaller than a predetermined value. When the difference is smaller than the predetermined value, the current mode is transitioned to the low power consumption mode 1. Meanwhile, when the difference is equal to or larger than the predetermined value, the procedure proceeds to step S107, the mode control unit 154 waits for a predetermined time (for example, five minutes) in step S107. Then, the procedure returns to step S103.

(2.2.2.2) Operation in Low Power Consumption Mode 1

Figure 12:
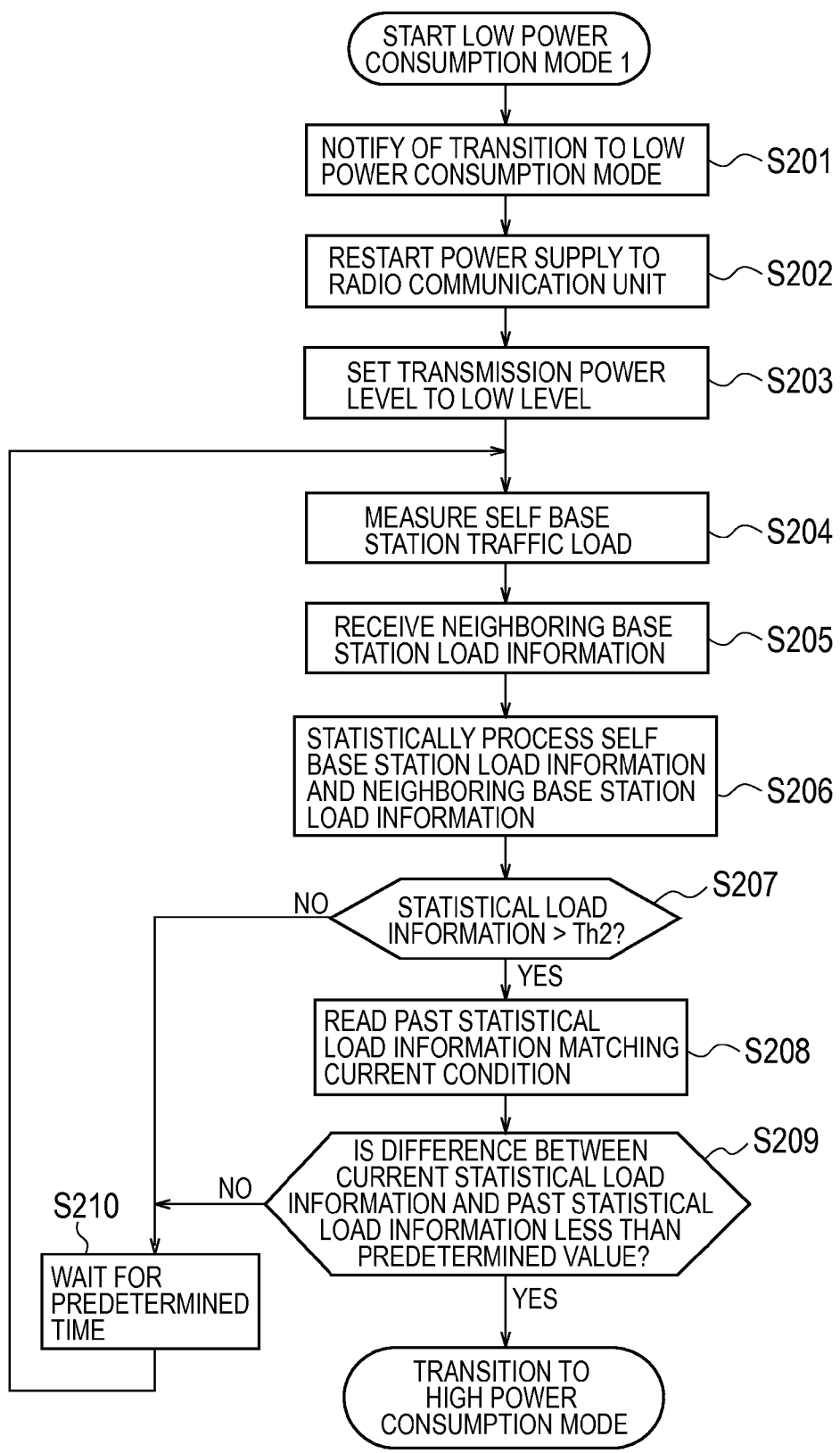
FIG. 12 is a flowchart illustrating an operation flow in the low power consumption mode 1 according to the second embodiment.

FIG. 12 is a flowchart illustrating an operation flow in the low power consumption mode 1.

As illustrated in FIG. 12, when the low power consumption mode 1 is started, the mode notification unit 155 controls the network communication unit 120 such that notification indicating the switching to the low power consumption mode is transmitted to the neighboring macro base station eNB-A, in step S201.

In step S202, the mode control unit 154 controls the power switch unit 132 such that the supply of power to the radio communication unit 110 is restarted. Specifically, the mode control unit 154 outputs a control signal to turn on the power switch unit 132 to the power switch unit 132.

In step S203, the mode control unit 154 sets a transmission power level of the radio communication unit 110 to a low level. For example, the mode control unit 154 performs setting such that the transmission power level of the radio communication unit 110 is limited to about the half of a maximum transmission power level.

In step S204, the traffic load measurement unit 151 measures the traffic load of the self base station and generates current self base station load information.

In step S205, the network communication unit 120 receives the current neighboring base station load information from the neighboring macro base station eNB-A. When the network communication unit 120 receives a plurality of types of current neighboring base station load information from a plurality of neighboring macro base stations eNB-A, the statistical processing unit 152 averages these neighboring base station load information.

In step S206, the statistical processing unit 152 statistically processes the current neighboring base station load information obtained by the network communication unit 120 and the current self base station load information obtained by the traffic load measurement unit 151, and generates current statistical load information.

In step S207, the mode control unit 154 confirms whether the current statistical load information obtained by the statistical processing unit 152 exceeds the threshold value Th2. When the current statistical load information exceeds the threshold value Th2, the procedure proceeds to step S208. Meanwhile, when the current statistical load information is equal to or smaller than the threshold value Th2, the procedure proceeds to step S210, and the mode control unit 154 waits for a predetermined time (for example, five minutes) in step S210. Then, the procedure returns to step S204.

In step S208, the load information management unit 153 reads the past statistical load information under the same conditions as those of the current statistical load information from the storage unit 140. Specifically, the load information management unit 153 searches for the past statistical load information matching the current season or day and the current time zone from the storage unit 140, and reads a result of the search.

In step S209, the mode control unit 154 calculates the difference between the current statistical load information and the past statistical load information under the same conditions as those of the current statistical load information, and confirms whether the difference is smaller than a predetermined value. When the difference is smaller than the predetermined value, the current mode is transitioned to the high power consumption mode. Meanwhile, when the difference is equal to or larger than the predetermined value, the procedure proceeds to step S210, the mode control unit 154 waits for a predetermined time (for example, five minutes) in step S210. Then, the procedure returns to step S204.

(2.2.2.3) Operation in High Power Consumption Mode

Figure 13:
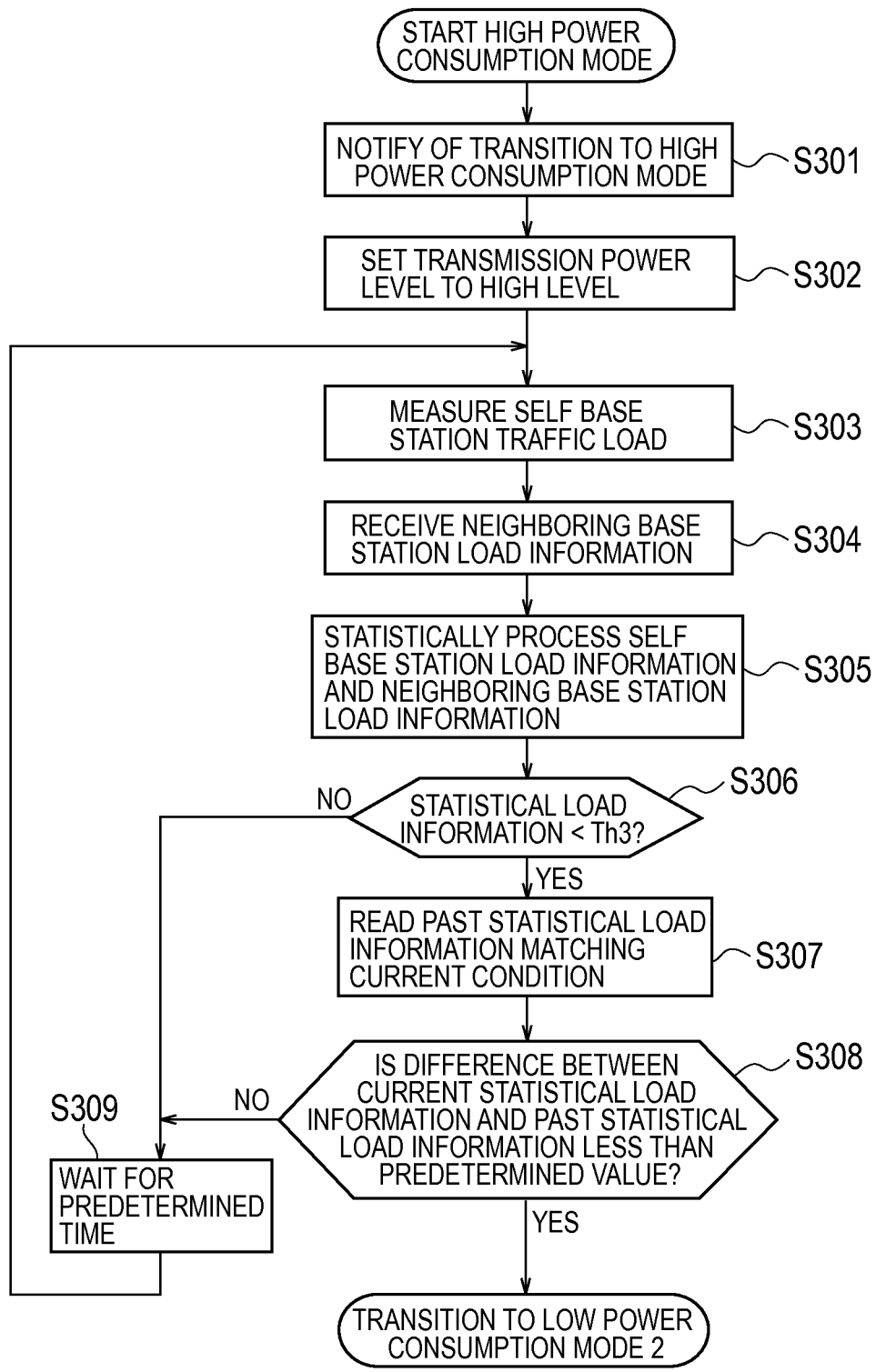
FIG. 13 is a flowchart illustrating an operation flow in the high power consumption mode according to the second embodiment.

FIG. 13 is a flowchart illustrating an operation flow in the high power consumption mode.

As illustrated in FIG. 13, when the high power consumption mode is started, the mode notification unit 155 controls the network communication unit 120 such that notification indicating the switching to the high power consumption mode is transmitted to the neighboring macro base station eNB-A, in step S301.

In step S302, the mode control unit 154 sets a transmission power level of the radio communication unit 110 to a high level. For example, the mode control unit 154 performs setting such that the transmission power level of the radio communication unit 110 is permitted to the maximum transmission power level.

In step S303, the traffic load measurement unit 151 measures the traffic load of the self base station and generates current self base station load information.

In step S304, the network communication unit 120 receives the current neighboring base station load information from the neighboring macro base station eNB-A. When the network communication unit 120 receives a plurality of types of current neighboring base station load information from a plurality of neighboring macro base stations eNB-A, the statistical processing unit 152 averages these neighboring base station load information.

In step S305, the statistical processing unit 152 statistically processes the current neighboring base station load information obtained by the network communication unit 120 and the current self base station load information obtained by the traffic load measurement unit 151, and generates current statistical load information.

In step S306, the mode control unit 154 confirms whether the current statistical load information obtained by the statistical processing unit 152 falls below the threshold value Th3. When the current statistical load information falls below the threshold value Th3, the procedure proceeds to step S307. Meanwhile, when the current statistical load information is equal to or larger than the threshold value Th3, the procedure proceeds to step S309, and the mode control unit 154 waits for a predetermined time (for example, five minutes) in step S309. Then, the procedure returns to step S303.

In step S307, the load information management unit 153 reads the past statistical load information under the same conditions as those of the current statistical load information from the storage unit 140. Specifically, the load information management unit 153 searches for the past statistical load information matching the current season or day and the current time zone from the storage unit 140, and reads a result of the search.

In step S308, the mode control unit 154 calculates the difference between the current statistical load information and the past statistical load information under the same conditions as those of the current statistical load information, and confirms whether the difference is smaller than a predetermined value. When the difference is smaller than the predetermined value, the current mode is transitioned to the low power consumption mode 2. Meanwhile, when the difference is equal to or larger than the predetermined value, the procedure proceeds to step S309, the mode control unit 154 waits for a predetermined time (for example, five minutes) in step S309. Then, the procedure returns to step S303.

(2.2.2.4) Operation in Low Power Consumption Mode 2

FIG. 14 is a flowchart illustrating an operation flow in the low power consumption mode 2.

As illustrated in FIG. 14, when the low power consumption mode 2 is started, the mode notification unit 155 controls the network communication unit 120 such that notification indicating the switching to the low power consumption mode is transmitted to the neighboring macro base station eNB-A, in step S401.

In step S402, the mode control unit 154 sets a transmission power level of the radio communication unit 110 to a low level. For example, the mode control unit 154 performs setting such that the transmission power level of the radio communication unit 110 is limited to about the half of a maximum transmission power level.

In step S403, the traffic load measurement unit 151 measures the traffic load of the self base station and generates current self base station load information.

In step S404, the network communication unit 120 receives the current neighboring base station load information from the neighboring macro base station eNB-A. When the network communication unit 120 receives a plurality of types of current neighboring base station load information from a plurality of neighboring macro base stations eNB-A, the statistical processing unit 152 averages these neighboring base station load information.

In step S405, the statistical processing unit 152 statistically processes the current neighboring base station load information obtained by the network communication unit 120 and the current self base station load information obtained by the traffic load measurement unit 151, and generates current statistical load information.

In step S406, the mode control unit 154 confirms whether the current statistical load information obtained by the statistical processing unit 152 falls below the threshold value Th4. When the current statistical load information falls below the threshold value Th4, the procedure proceeds to step S408. Meanwhile, when the current statistical load information is equal to or larger than the threshold value Th4, the procedure proceeds to step S409, and the mode control unit 154 waits for a predetermined time (for example, five minutes) in step S409. Then, the procedure returns to step S403.

In step S407, the load information management unit 153 reads the past statistical load information under the same conditions as those of the current statistical load information from the storage unit 140. Specifically, the load information management unit 153 searches for the past statistical load information matching the current season or day and the current time zone from the storage unit 140, and reads a result of the search.

In step S408, the mode control unit 154 calculates the difference between the current statistical load information and the past statistical load information under the same conditions as those of the current statistical load information, and confirms whether the difference is smaller than a predetermined value. When the difference is smaller than the predetermined value, the current mode is transitioned to the power-off mode. Meanwhile, when the difference is equal to or larger than the predetermined value, the procedure proceeds to step S409, the mode control unit 154 waits for a predetermined time (for example, five minutes) in step S409. Then, the procedure returns to step S403.

(2.3) Effect of Second Embodiment

As described above, the micro base station eNB-B according to the second embodiment performs control to switch the power consumption state of the radio communication unit 110 on the basis of the statistical load information obtained by statistically processing the neighboring base station load information and the self base station load information. In this way, the micro base station eNB-B is able to switch the power consumption state of the radio communication unit 110 in consideration of the traffic load of the self base station.

(3) Other Embodiments

As described above, the present invention has been described according to the embodiments. However, it should not be understood that the discussions and drawings constituting a part of this disclosure limit the present invention. From this disclosure, various alternative embodiments, examples and operational techniques are apparent to those skilled in the art.

For example, in the aforementioned embodiments, an integral type base station configuration, in which the radio communication unit 110 and the control unit 150 are accommodated in the same housing, was considered. However, it may be possible to employ a separation type base station configuration in which the radio communication unit 110 and the control unit 150 may be accommodated in separated housings and the housings are connected to each other using a cable. In addition, the housing, in which the radio communication unit 110 is accommodated, is often called a remote radio head (RRH).

In the aforementioned embodiments, an example, in which the transmission power level of the radio communication unit 110 is set to a low level in the low power consumption mode, was described. However, as well as such a power saving method, power saving may be achieved by limiting a frequency band (the number of RRBs) used by the radio communication unit 110.

In the aforementioned embodiments, the operation of the neighboring macro base station eNB-A was not particularly described. However, the neighboring macro base station eNB-A received notification for mode switching from the micro base station eNB-B may control the transmission power level in consideration of the notification.

As described above, it must be understood that the present invention includes various embodiments and the like that are not described herein.

Note that the entire content of the Japanese Patent Application No. 2010-252347 (filed on Nov. 10, 2010) is incorporated herein by reference.

Industrial Applicability

As mentioned above, a base station and a control method thereof of the present invention is useful for radio communication such as mobile communication, with which it is possible to reduce power consumption while preventing the deterioration of service quality.

The invention claimed is:

1. A base station, which is adjacent to a macro base station and used in a cellular mobile communication system, comprising:

a radio communication unit that communicates with a radio terminal;

a control unit that performs control to switch a power consumption state of the radio communication unit on a basis of neighboring base station load information on a traffic load of the macro base station adjacent to the base station;

a network communication unit that receives the neighboring base station load information using inter-base-station communication; and a storage unit, wherein the control unit performs control to switch the radio communication unit from a power-off mode, in which an operation of the radio communication unit is stopped, to a low power consumption mode, in which the radio communication unit operates in a low power consumption state, on the basis of the neighboring base station load information received by the network communication unit, the neighboring base station load information includes first neighboring base station load information newly received by the network communication unit, the control unit performs control to switch the radio communication unit from the power-off mode to the low power consumption mode, when the first neighboring base station load information exceeds a first threshold value, the neighboring base station load information includes second neighboring base station load information stored in the storage unit according to conditions, which is neighboring base station load information obtained in a past by the network communication unit, and the control unit, even in a case in which the first neighboring base station load information exceeds the first threshold value, performs control such that the radio communication unit is not switched from the power-off mode to the low power consumption mode, when a difference between the first neighboring base station load information and the second neighboring base station load information under a same condition as a condition of the first neighboring base station load information is equal to or larger than a predetermined value, or when the second neighboring base station load information under the same condition as the condition of the first neighboring base station load information falls below the first threshold value.

2. A base station, which is adjacent to a macro base station and used in a cellular mobile communication system, comprising:

a radio communication unit that communicates with a radio terminal; and a control unit that performs control to switch a power consumption state of the radio communication unit on a basis of neighboring base station load information on a traffic load of the macro base station adjacent to the base station; and a network communication unit that receives the neighboring base station load information using inter-base-station communication, wherein the control unit performs control to switch the power consumption state of the radio communication unit on the basis of the neighboring base station load information received by the network communication unit, the control unit performs control to switch the radio communication unit from a low power consumption mode, in which the radio communication unit operates in a low power consumption state, to a high power consumption mode, in which the radio communication unit operates in a high power consumption state, on the basis of the neighboring base station load information, the neighboring base station load information includes first neighboring base station load information newly received by the network communication unit, and the control unit performs control to switch the radio communication unit from the low power consumption mode to the high power consumption mode, when the first neighboring base station load information exceeds a second threshold value.

3. The base station according to claim 2, further comprising a storage unit, wherein the neighboring base station load information includes second neighboring base station load information stored in the storage unit according to conditions, which is neighboring base station load information obtained in a past by the network communication unit, and the control unit, even in a case in which the first neighboring base station load information exceeds the second threshold value, performs control such that the radio communication unit is not switched from the low power consumption mode to the high power consumption mode, when a difference between the first neighboring base station load information and the second neighboring base station load information under a same condition as a condition of the first neighboring base station load information is equal to or larger than a predetermined value, or when the second neighboring base station load information under the same condition as the condition of the first neighboring base station load information falls below the second threshold value.

4. A base station, which is adjacent to a macro base station and used in a cellular mobile communication system, comprising:

a radio communication unit that communicates with a radio terminal;

a control unit that performs control to switch a power consumption state of the radio communication unit on a basis of neighboring base station load information on a traffic load of the macro base station adjacent to the base station; and a network communication unit that receives the neighboring base station load information using inter-base-station communication, wherein the control unit performs control to switch the power consumption state of the radio communication unit on the basis of the neighboring base station load information received by the network communication unit, the control unit performs control to switch the radio communication unit from a high power consumption mode, in which the radio communication unit operates in a high power consumption state, to a low power consumption mode, in which the radio communication unit operates in a low power consumption state, on the basis of the neighboring base station load information, the neighboring base station load information includes first neighboring base station load information newly received by the network communication unit, and the control unit performs control to switch the radio communication unit from the high power consumption mode to the low power consumption mode, when the first neighboring base station load information falls below a third threshold value.

5. The base station according to claim 4, further comprising a storage unit, wherein the neighboring base station load information is includes second neighboring base station load information stored in the storage unit according to conditions, which is neighboring base station load information obtained in a past by the network communication unit, and the control unit, even in a case in which the first neighboring base station load information falls below the third threshold value, performs control such that the radio communication unit is not switched from the high power consumption mode to the low power consumption mode, when a difference between the first neighboring base station load information and the second neighboring base station load information under a same condition as a condition of the first neighboring base station load information is equal to or larger than a predetermined value, or when the second neighboring base station load information under the same condition as the condition of the first neighboring base station load information exceeds the third threshold value.

6. A base station, which is adjacent to a macro base station and used in a cellular mobile communication system, comprising:

a radio communication unit that communicates with a radio terminal; and a control unit that performs control to switch a power consumption state of the radio communication unit on a basis of neighboring base station load information on a traffic load of the macro base station adjacent to the base station;

a network communication unit that receives the neighboring base station load information using inter-base-station communication; and a storage unit, wherein the control unit performs control to switch the radio communication unit from a low power consumption mode, in which the radio communication unit operates in a low power consumption state, to a power-off mode, in which an operation of the radio communication unit is stopped, on the basis of the neighboring base station load information received by the network communication unit, the neighboring base station load information includes first neighboring base station load information newly received by the network communication unit, the control unit performs control to switch the radio communication unit from the low power consumption mode to the power-off mode, when the first neighboring base station load information falls below a fourth threshold value, the neighboring base station load information includes second neighboring base station load information stored in the storage unit according to conditions, which is neighboring base station load information obtained in a past by the network communication unit, and the control unit, even in a case in which the first neighboring base station load information falls below the fourth threshold value, performs control such that the radio communication unit is not switched from the low power consumption mode to the power-off mode, when a difference between the first neighboring base station load information and the second neighboring base station load information under a same condition as a condition of the first neighboring base station load information is equal to or larger than a predetermined value, or when the second neighboring base station load information under the same condition as the condition of the first neighboring base station load information exceeds the fourth threshold value.

* * * * *